(12) United States Patent
Inoue et al.

(10) Patent No.: US 12,267,634 B2
(45) Date of Patent: Apr. 1, 2025

(54) PROJECTION APPARATUS, PROJECTION METHOD, CONTROL DEVICE, AND CONTROL PROGRAM

(71) Applicant: FUJIFILM Corporation, Tokyo (JP)

(72) Inventors: Kazuki Inoue, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 103 days.

(21) Appl. No.: 17/852,586

(22) Filed: Jun. 29, 2022

(65) Prior Publication Data

US 2023/0007219 A1 Jan. 5, 2023

(30) Foreign Application Priority Data

Jun. 30, 2021 (JP) .................................. 2021-109580

(51) Int. Cl.
*H04N 7/18* (2006.01)
*G03B 21/26* (2006.01)
*H04N 9/31* (2006.01)

(52) U.S. Cl.
CPC ........... *H04N 9/3185* (2013.01); *G03B 21/26* (2013.01); *H04N 9/3102* (2013.01)

(58) Field of Classification Search
CPC .................................................. H04N 9/3185
USPC .......................................................... 348/30
See application file for complete search history.

(56) References Cited

U.S. PATENT DOCUMENTS

| | | | | |
|---|---|---|---|---|
| 2008/0136976 A1* | 6/2008 | Ajito | ..................... | H04N 9/3185 348/745 |
| 2008/0297741 A1* | 12/2008 | Matsuda | ............... | G03B 21/142 353/101 |
| 2009/0096939 A1* | 4/2009 | Nomizo | ............... | H04N 9/3147 348/744 |
| 2010/0073641 A1* | 3/2010 | Han | ...................... | G02B 26/005 353/38 |
| 2011/0090409 A1 | 4/2011 | Kawasaki et al. | | |

(Continued)

FOREIGN PATENT DOCUMENTS

JP 2006-227441 A 8/2006
JP 2009-157175 A 7/2009
(Continued)

OTHER PUBLICATIONS

Japanese Office Action for corresponding Japanese Application No. 2021-109580, dated Dec. 10, 2024, with an English translation.

*Primary Examiner* — Leron Beck
(74) *Attorney, Agent, or Firm* — Birch, Stewart, Kolasch & Birch, LLP

(57) ABSTRACT

A projection apparatus, a projection method, a control device, and a computer readable medium storing a control program that enable an instruction operation for geometric processing to be easily performed are provided. A projection portion projects a projection image generated by a light modulation portion based on an input image. In a case of performing geometric processing of the projection image in a non-display region other than a display region of the projection image within a displayable region of the light modulation portion, a control device performs a control of projecting a support image showing at least a part of the displayable region from the projection portion.

26 Claims, 22 Drawing Sheets

(56) References Cited

U.S. PATENT DOCUMENTS

| | | | | |
|---|---|---|---|---|
| 2015/0022715 A1* | 1/2015 | Yokoyama | ............ | H04N 25/531 |
| | | | | 348/370 |
| 2015/0138240 A1 | 5/2015 | Hiranuma | | |
| 2017/0034491 A1* | 2/2017 | Saigo | .................... | G06T 7/0002 |
| 2017/0272717 A1* | 9/2017 | Nishizawa | ............ | G03B 21/005 |
| 2018/0357036 A1* | 12/2018 | Tomita | ................... | H04N 7/147 |
| 2019/0302594 A1* | 10/2019 | Higashi | .............. | G03B 21/2006 |
| 2020/0152105 A1* | 5/2020 | Ishii | ................... | G02B 27/0172 |

FOREIGN PATENT DOCUMENTS

| | | | |
|---|---|---|---|
| JP | 2011-090038 | A | 5/2011 |
| JP | 2011-135445 | A | 7/2011 |
| JP | 2012-5013 | A | 1/2012 |
| JP | 2014-081560 | A | 5/2014 |
| JP | 2015-121779 | A | 7/2015 |
| JP | 2018-163285 | A | 10/2018 |
| JP | 2019-192997 | A | 10/2019 |
| JP | 2019-193215 | A | 10/2019 |

* cited by examiner

PROJECTION APPARATUS, PROJECTION METHOD, CONTROL DEVICE, AND CONTROL PROGRAM

CROSS-REFERENCE TO RELATED APPLICATIONS

This application is based upon and claims the benefit of priority from prior Japanese patent application No. 2021-109580, filed on Jun. 30, 2021, the entire contents of which are incorporated herein by reference.

BACKGROUND OF THE INVENTION

1. Field of the Invention

The present invention relates to a projection apparatus, a projection method, a control device, and a computer readable medium storing a control program.

2. Description of the Related Art

JP2018-163285A discloses displaying an image based on input image data and setting a region other than the image as a black background region in a projector that generates display image data by applying a visual stage effect to the input image data.

JP2014-081560A discloses making an internal data image overlap with a content image such that the internal data image is displayed in a non-display region in an image output device that enables internal data of a projection system and a content to be visible at the same time.

JP2011-135445A discloses projecting a projection image to an inner side and setting a region around the inner side as a non-display region (black projection region) in an image projection apparatus such as a projector that has a function of performing color correction of the projection image using reflected light from a projection surface.

JP2011-090038A discloses displaying a notification video for providing notification of information related to an input source of a video displayed in a main window and a notification video for providing notification of information related to an input source of a video displayed in a subwindow in a blank region that is a region in which a video is not displayed, in a projection video display device that can display a plurality of videos at the same time on the same screen.

SUMMARY OF THE INVENTION

One embodiment according to the disclosed technology provides a projection apparatus, a projection method, a control device, and a computer readable medium storing a control program that enable an instruction operation for geometric processing of a projection image to be easily performed.

A projection apparatus according to an aspect of the present invention comprises a projection portion that projects a projection image generated by a display element based on an input image, and a processor, in which the processor is configured to, in a case of performing geometric processing of the projection image in a non-display region other than a display region of the projection image within a displayable region of the display element, perform a control of projecting a support image showing at least a part of the displayable region from the projection portion.

A projection method according to another aspect of the present invention is a projection method of a projection apparatus including a projection portion that projects a projection image generated by a display element based on an input image, the projection method comprising, by a processor configured to control the projection apparatus, performing, in a case of performing geometric processing of the projection image in a non-display region other than a display region of the projection image within a displayable region of the display element, a control of projecting a support image showing at least a part of the displayable region from the projection portion.

A control device according to still another aspect of the present invention is a control device of a projection apparatus including a projection portion that projects a projection image generated by a display element based on an input image, the control device comprising a processor, in which the processor is configured to, in a case of performing geometric processing of the projection image in a non-display region other than a display region of the projection image within a displayable region of the display element, perform a control of projecting a support image showing at least a part of the displayable region from the projection portion.

A non-transitory computer readable medium storing a control program according to still another aspect of the present invention is a non-transitory computer readable medium storing a control program of a projection apparatus including a projection portion that projects a projection image generated by a display element based on an input image, the control program causing a processor configured to control the projection apparatus to execute a process comprising performing, in a case of performing geometric processing of the projection image in a non-display region other than a display region of the projection image within a displayable region of the display element, a control of projecting a support image showing at least a part of the displayable region from the projection.

According to the present invention, a projection apparatus, a projection method, a control device, and a computer readable medium storing a control program that enable an instruction operation for geometric processing to be easily performed can be provided.

BRIEF DESCRIPTION OF THE DRAWINGS

FIG. 7 is a diagram illustrating an example of enlargement of a projection image 5a.

FIG. 8 is a diagram illustrating an example of rotation of the projection image 5a.

FIG. 9 is a diagram illustrating an example of modification of the projection image 5a.

FIG. 10 is a diagram illustrating an example of shifting of the projection image 5a.

FIG. 12 is a diagram illustrating an example of rotation of an operation image 8 accompanied by the rotation of the projection image 5a.

DESCRIPTION OF THE PREFERRED EMBODIMENTS

Hereinafter, an example of an embodiment of the present invention will be described with reference to the drawings.

Embodiment

Schematic Configuration of Projection Apparatus 10 of Embodiment

Figure 1:
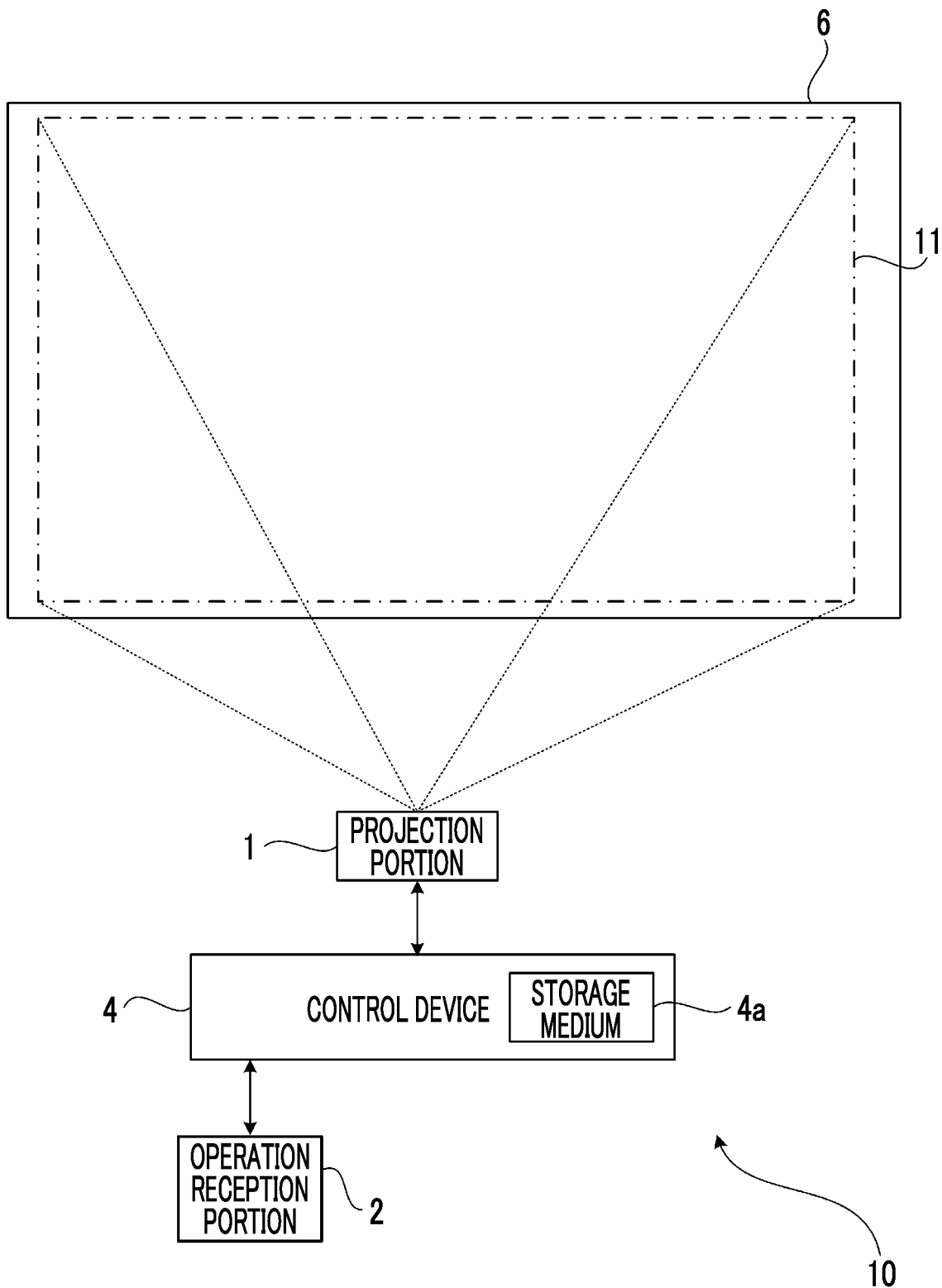
FIG. 1 is a schematic diagram illustrating a schematic configuration of a projection apparatus 10 to which a control device of an embodiment is applied.

FIG. 1 is a schematic diagram illustrating a schematic configuration of a projection apparatus 10 of the embodiment.

The projection apparatus 10 comprises a projection portion 1, a control device 4, and an operation reception portion 2. The projection portion 1 is configured with, for example, a liquid crystal projector or a projector using liquid crystal on silicon (LCOS). Hereinafter, the projection portion 1 will be described as a liquid crystal projector.

The control device 4 controls projection performed by the projection apparatus 10. In addition, the control device 4 is an example of a control device according to the embodiment of the present invention. The control device 4 is a device including a control portion configured with various processors, a communication interface (not illustrated) for communicating with each portion, and a storage medium 4a such as a hard disk, a solid state drive (SSD), or a read only memory (ROM) and generally controls the projection portion 1. Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and an FPGA).

The operation reception portion 2 detects an instruction (user instruction) from a user by receiving various operations from the user. In the present embodiment, the operation reception portion 2 is an operating part such as a button, a key, or a joystick provided in a main body of the projection apparatus 10.

A projection target object 6 is an object such as a screen having a projection surface on which a projection image is displayed by the projection portion 1. In the example illustrated in FIG. 1, the projection surface of the projection target object 6 is a rectangular plane. It is assumed that upper, lower, left, and right sides of the projection target object 6 in FIG. 1 are upper, lower, left, and right sides of the actual projection target object 6.

A projectable range 11 illustrated by a dot dashed line is a range within which projection can be performed by the projection portion 1 in the projection target object 6. That is, the projection portion 1 can perform the projection within a part or the entirety of the projectable range 11. In the example illustrated in FIG. 1, the projectable range 11 is rectangular.

Figure 3:
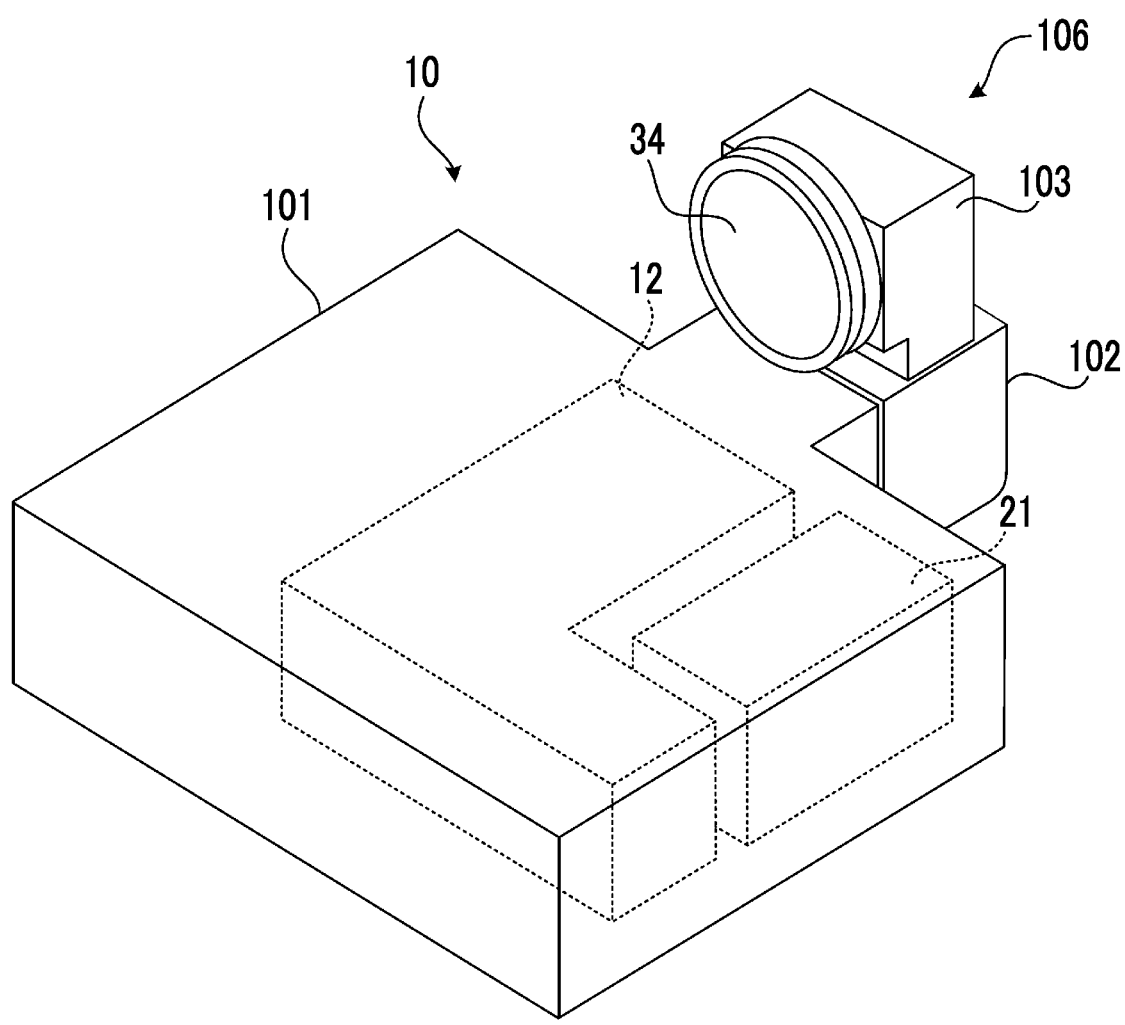
FIG. 3 is a schematic diagram illustrating an exterior configuration of the projection apparatus 10.
Figure 4:
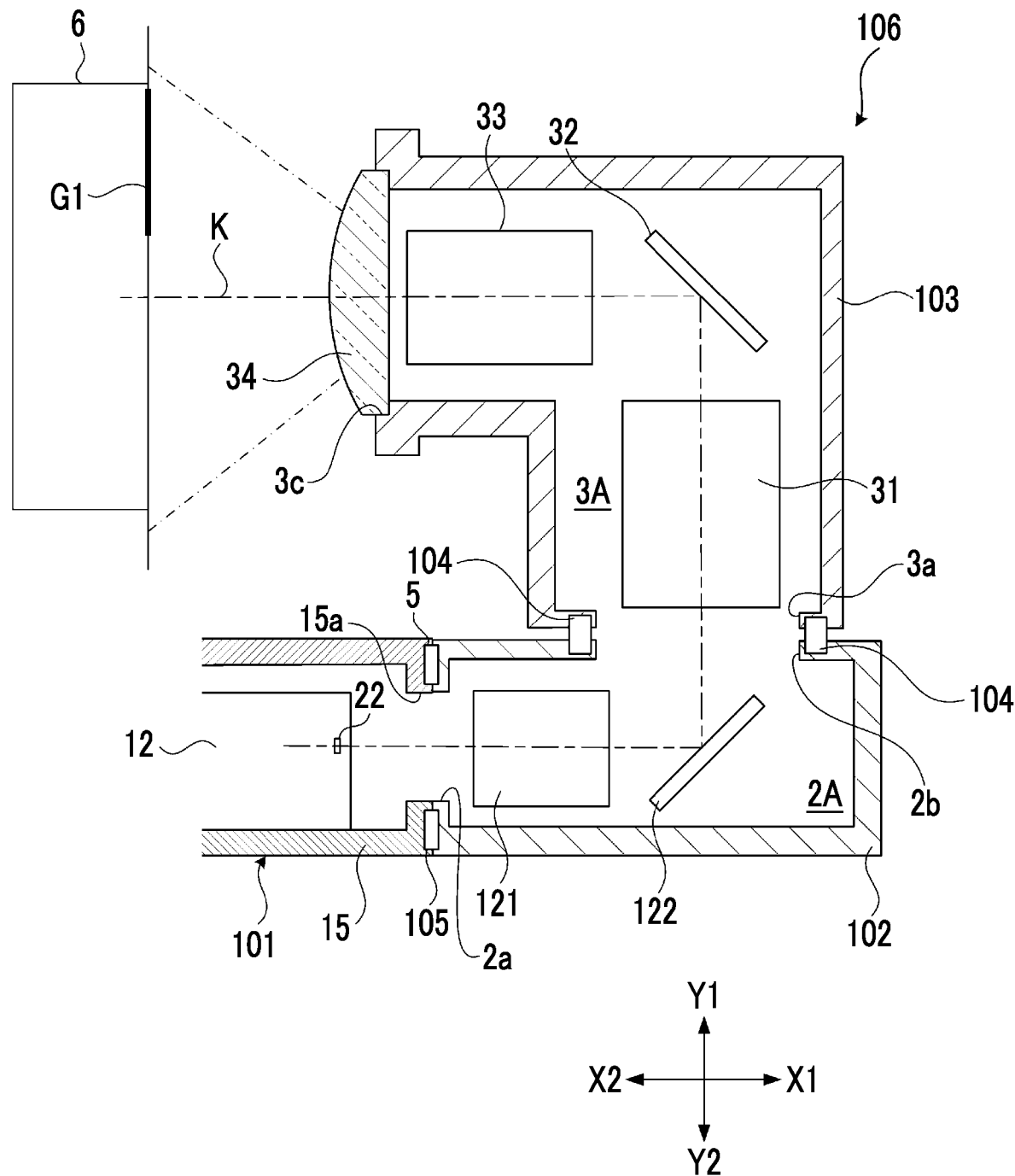
FIG. 4 is a schematic cross-sectional view of an optical unit 106 of the projection apparatus 10 illustrated in FIG. 3.

The projection portion 1, the control device 4, and the operation reception portion 2 are implemented by, for example, one device (for example, refer to FIG. 3 and FIG. 4). Alternatively, the projection portion 1, the control device 4, and the operation reception portion 2 may be separate devices that cooperate by communicating with each other.

Internal Configuration of Projection Portion 1 Illustrated in FIG. 1

Figure 2:
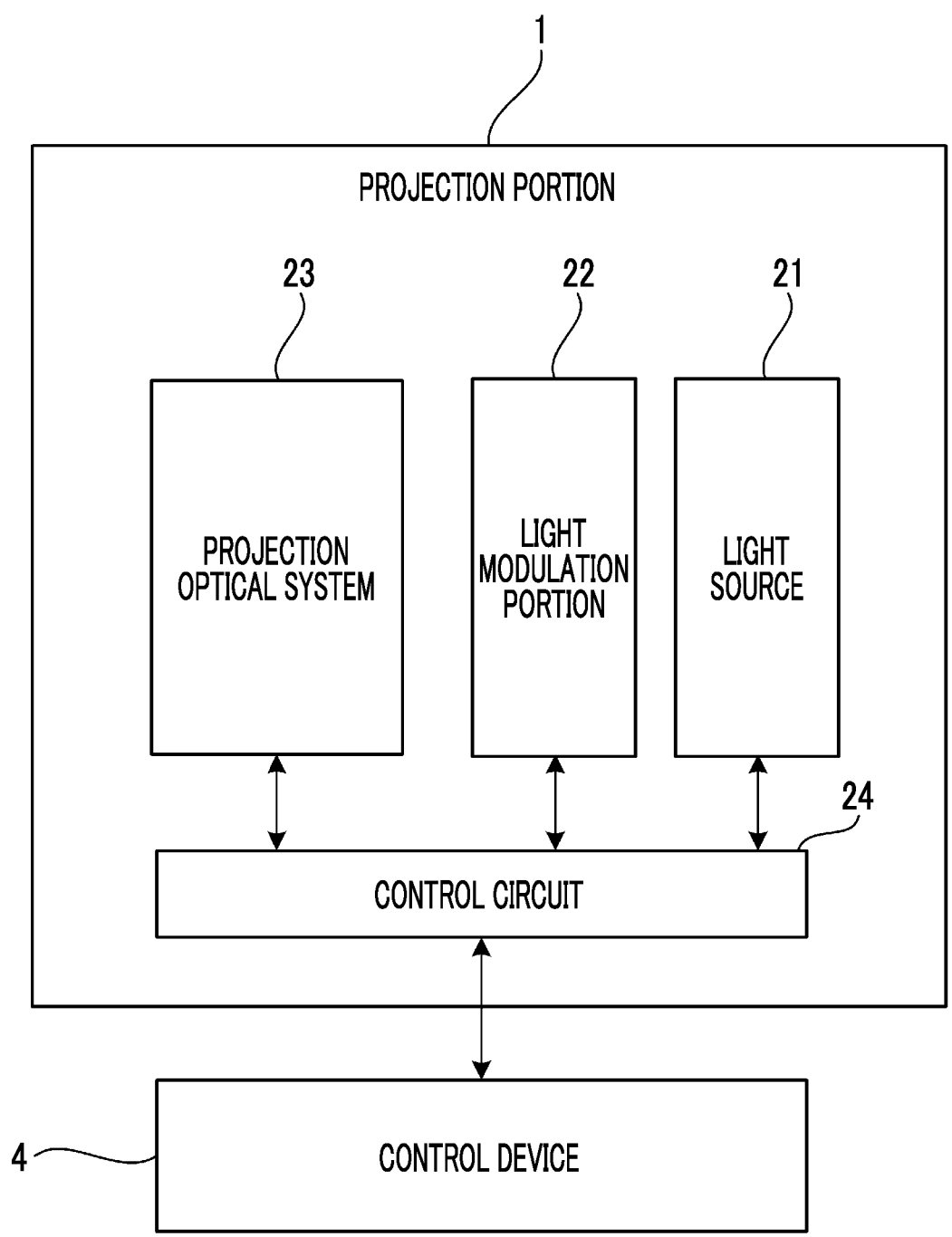
FIG. 2 is a schematic diagram illustrating an example of an internal configuration of a projection portion 1 illustrated in FIG. 1.

FIG. 2 is a schematic diagram illustrating an example of an internal configuration of the projection portion 1 illustrated in FIG. 1.

As illustrated in FIG. 2, the projection portion 1 comprises a light source 21, a light modulation portion 22, a projection optical system 23, and a control circuit 24.

The light source 21 includes a light emitting element such as a laser or a light emitting diode (LED) and emits, for example, white light.

The light modulation portion 22 is a light modulation element configured with three liquid crystal panels that emit each color image by modulating, based on image information, each color light which is emitted from the light source 21 and is separated into three colors of red, blue, and green by a color separation mechanism, not illustrated. Filters of red, blue, and green may be mounted in each of the three liquid crystal panels, and each color image may be emitted by modulating the white light emitted from the light source 21 in each liquid crystal panel. The light modulation portion 22 is an example of a display element according to the embodiment of the present invention.

The light from the light source 21 and the light modulation portion 22 is incident on the projection optical system 23. The projection optical system 23 includes at least one lens and is configured with, for example, a relay optical system. The light that has passed through the projection optical system 23 is projected to the projection target object 6.

In the projection target object 6, a region irradiated with the light transmitted through the entire range of the light modulation portion 22 is the projectable range 11 within which the projection can be performed by the projection portion 1. In the projectable range 11, a region that is actually irradiated with the light transmitted through the light modulation portion 22 is a projection range. For example, in the projectable range 11, a size, a position, and a shape of the projection range are changed by controlling a size, a position, and a shape of a region through which the light is transmitted in the light modulation portion 22.

The control circuit 24 projects an image based on display data to the projection target object 6 by controlling the light source 21, the light modulation portion 22, and the projection optical system 23 based on the display data input from the control device 4. The display data input into the control circuit 24 is configured with three constituents of red display data, blue display data, and green display data.

In addition, the control circuit 24 enlarges or reduces the projection range (refer to FIG. 1) of the projection portion 1 by changing the projection optical system 23 based on an instruction input from the control device 4. In addition, the control device 4 may move the projection range of the projection portion 1 by changing the projection optical system 23 based on an operation received by the operation reception portion 2 from the user.

In addition, the projection apparatus 10 comprises a shift mechanism that mechanically or optically moves the projection range while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least any of an optical system shift mechanism that performs optical system shifting, or an electronic shift mechanism that performs electronic shifting.

The optical system shift mechanism is, for example, a mechanism (for example, refer to FIG. 3 and FIG. 4) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination.

The electronic shift mechanism is a mechanism that performs pseudo shifting of the projection range by changing a range through which the light is transmitted in the light modulation portion 22.

In addition, the projection apparatus 10 may comprise a projection direction changing mechanism that moves the image circle of the projection optical system 23 and the projection range. The projection direction changing mechanism is a mechanism that changes a projection direction of the projection portion 1 by changing a direction of the projection portion 1 by mechanical rotation (for example, refer to FIG. 3 and FIG. 4).

Mechanical Configuration of Projection Apparatus 10

FIG. 3 is a schematic diagram illustrating an exterior configuration of the projection apparatus 10. FIG. 4 is a schematic cross-sectional view of an optical unit 106 of the projection apparatus 10 illustrated in FIG. 3. FIG. 4 illustrates a cross section in a plane along an optical path of the light emitted from a body part 101 illustrated in FIG. 3.

As illustrated in FIG. 3, the projection apparatus 10 comprises the body part 101 and the optical unit 106 that is provided to protrude from the body part 101. In the configuration illustrated in FIG. 3, the operation reception portion 2, the control device 4, and the light source 21, the light modulation portion 22, and the control circuit 24 in the projection portion 1 are provided in the body part 101. The projection optical system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed by the light spatially modulated by the light modulation unit 12 is incident on the optical unit 106 through the opening 15a of the housing 15 and is projected to the projection target object 6 as a projection target object. Accordingly, an image G1 is visible from an observer.

As illustrated in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 arranged in the hollow portion 2A, a second optical system 31, a reflective member 32, a third optical system 33, and a lens 34 arranged in the hollow portion 3A, a shift mechanism 105, and a projection direction changing mechanism 104.

The first member 102 is a member having, for example, a rectangular cross-sectional exterior, in which an opening 2a and an opening 2b are formed in surfaces perpendicular to each other. The first member 102 is supported by the body part 101 in a state where the opening 2a is arranged at a position facing the opening 15a of the body part 101. The light emitted from the light modulation portion 22 of the light modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 4, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection apparatus 10 is arranged such that the direction Y2 is a vertical direction.

The projection optical system 23 illustrated in FIG. 2 is composed of the first optical system 121, the reflective member 122, the second optical system 31, the reflective member 32, the third optical system 33, and the lens 34. An optical axis K of the projection optical system 23 is illustrated in FIG. 4. The first optical system 121, the reflective member 122, the second optical system 31, the reflective member 32, the third optical system 33, and the lens 34 are arranged in this order from the light modulation portion 22 side along the optical axis K.

The first optical system 121 includes at least one lens and guides the light that is incident on the first member 102 from the body part 101 and travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior, in which an opening 3a is formed at a position facing the opening 2b of the first member 102. The light that has passed through the opening 2b of the first member 102 from the body part 101 is incident into the hollow portion 3A of the second member 103 through the opening 3a. The first member 102 and the second member 103 may have any cross-sectional exterior and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is configured with, for example, a mirror.

The third optical system 33 includes at least one lens and guides the light reflected by the reflective member 32 to the lens 34.

The lens 34 is arranged in an end part of the second member 103 on the direction X2 side in the form of closing the opening 3c formed in this end part. The lens 34 projects the light incident from the third optical system 33 to the projection target object 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to an arrangement position illustrated in FIG. 4 as long as the projection direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 by the shift mechanism 105 from the state illustrated in FIG. 4, a relative position between a center of the image (in other words, a center of a display surface) formed by the light modulation portion 22 and the optical axis K changes, and the image G1 projected to the projection target object 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the projection target object 6 can be moved in the direction Y2.

Projection Performed by Projection Apparatus 10

Figure 5:
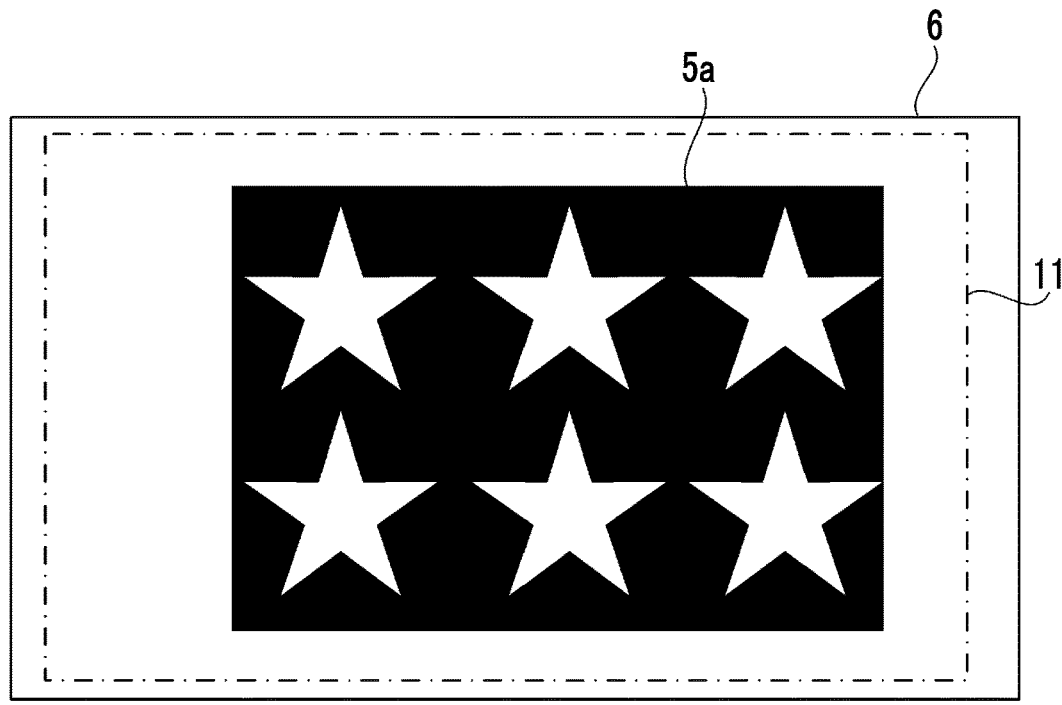
FIG. 5 is a diagram illustrating an example of projection performed by the projection apparatus 10.
Figure 5:
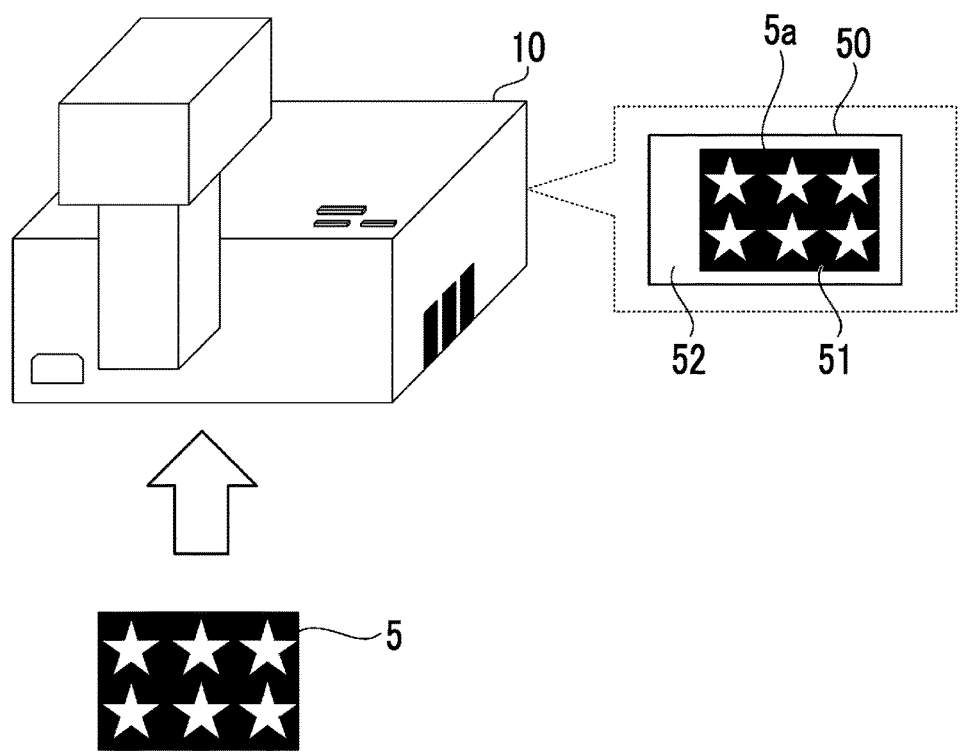

FIG. 5 is a diagram illustrating an example of the projection performed by the projection apparatus 10. In the example in FIG. 5, an input image 5 is input into the projection apparatus 10. A displayable region 50 is a displayable region of the light modulation portion 22 (display element). An image displayed in the entire displayable region 50 is projected to the entire projectable range 11 by the projection optical system 23.

In the example in FIG. 5, the projection apparatus 10 displays the projection image 5a based on the input image 5 in a part of the displayable region 50. Consequently, the projection image 5a is projected to a part of the projectable range 11. A display region 51 is a region in which the projection image 5a is displayed in the displayable region 50. A non-display region 52 is a region other than the display region 51, that is, a region in which the projection image 5a is not displayed, in the displayable region 50.

Projection of Support Image Performed by Projection Apparatus 10

Figure 6:
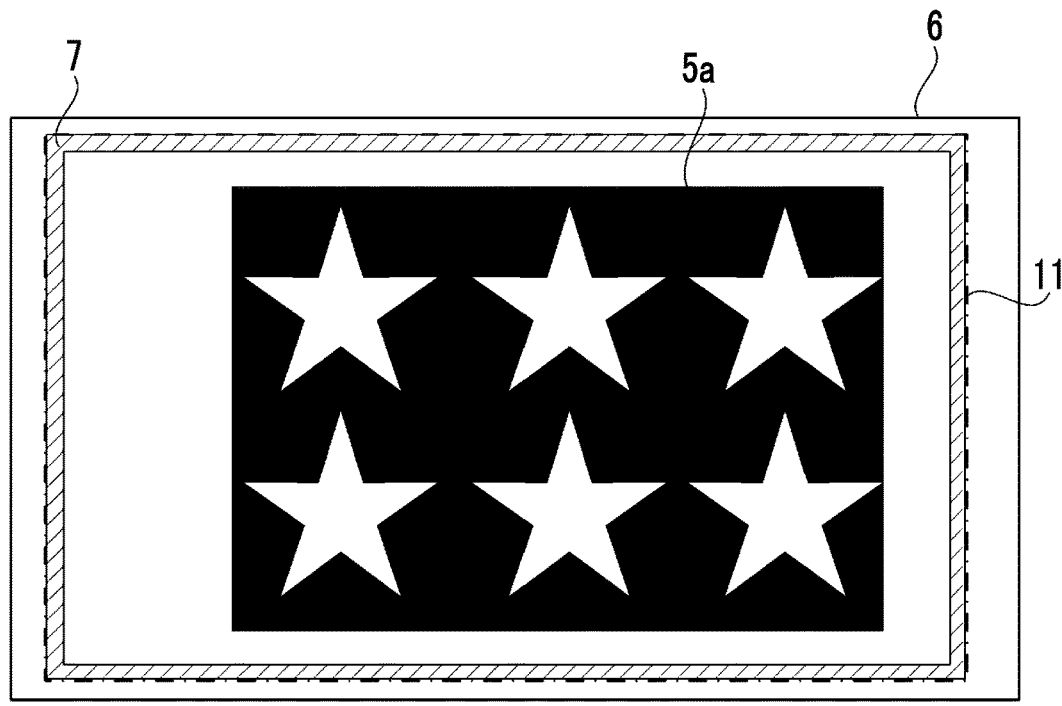
FIG. 6 is a diagram illustrating an example of projection of a support image performed by the projection apparatus 10.
Figure 6:
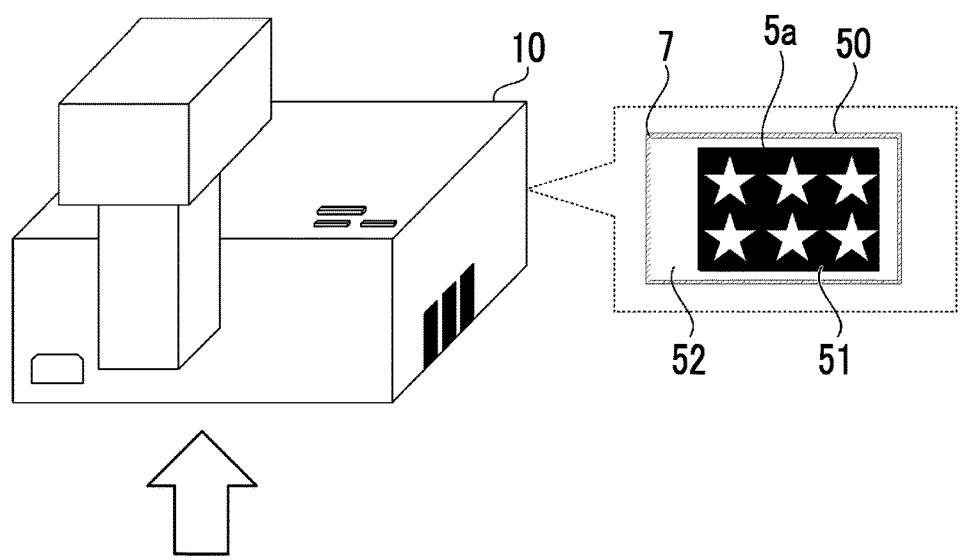
Figure 6:
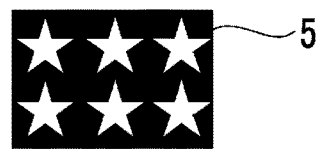

FIG. 6 is a diagram illustrating an example of projection of a support image performed by the projection apparatus 10. For example, the control device 4 performs geometric processing of the projection image 5a in the non-display region 52 by receiving an instruction from the user. The geometric processing is not processing in units of pixels such as blur processing and is geometric processing of the projection image 5a. For example, the geometric processing is electrical processing performed by processing the input image 5 input into the light modulation portion 22.

The geometric processing of the projection image 5a in the non-display region 52 is the geometric processing of the projection image 5a using the non-display region 52. Specifically, the geometric processing of the projection image 5a in the non-display region 52 is geometric processing of changing the projection image 5a such that at least a part of the projection image 5a is included in at least a part of the non-display region 52 before the geometric processing. Specific examples of the geometric processing include geometric processing including at least any of enlargement, rotation, modification, or movement (shifting) of the projection image 5*a*. The modification of the projection image 5*a* includes distortion correction of the projection image 5*a* such as keystone correction. In addition to these geometric processing, for example, the control device 4 may also perform geometric processing such as reduction.

In addition, in a case of performing the geometric processing of the projection image 5*a* in the non-display region 52, the control device 4 performs a control of projecting a support image 7 showing at least a part of the displayable region 50 from the projection portion 1. Specifically, the control device 4 performs the control of projecting the support image 7 from the projection portion 1 in a state where the instruction for the geometric processing of the projection image 5*a* can be received from the user via the operation reception portion 2.

The support image 7 is an image that directly or indirectly shows a boundary between the displayable region 50 and an outside of the displayable region 50 to the user. In other words, the support image 7 is an image that shows a range within which the geometric processing of the input image 5 using the non-display region 52 can be performed, to the user. In the example illustrated in FIG. 7, the support image 7 is an image of a peripheral frame of the displayable region 50. The peripheral frame of the displayable region 50 is a frame inscribed in a periphery of the displayable region 50.

Enlargement of Projection Image 5*a*

Figure 7:
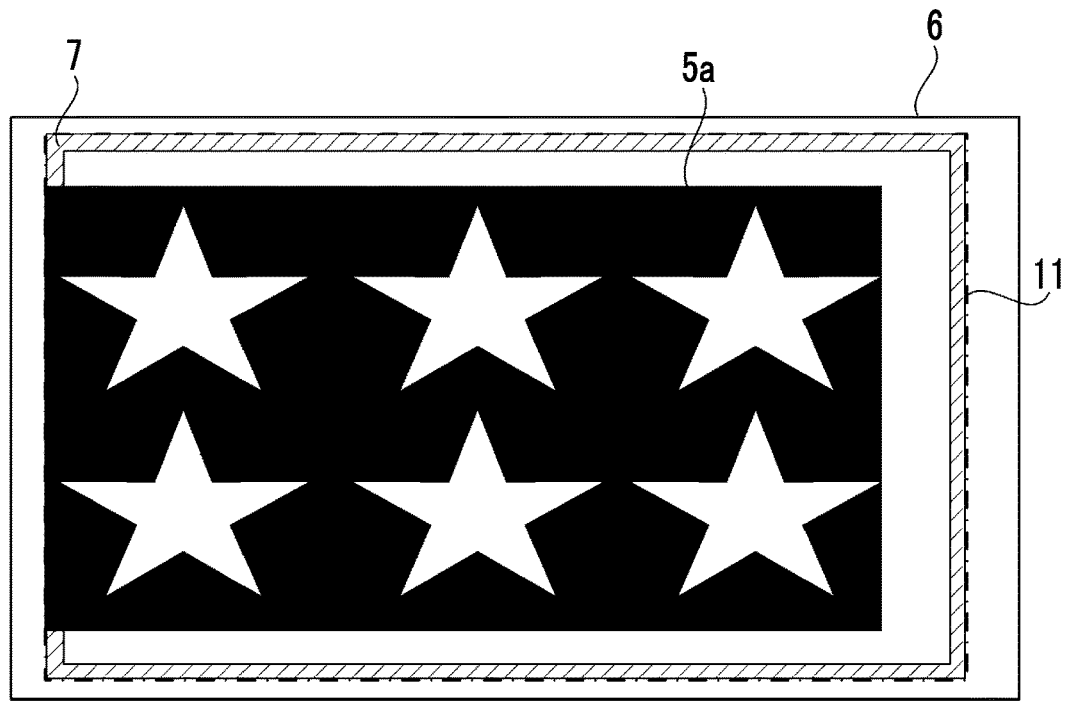
Figure 7:
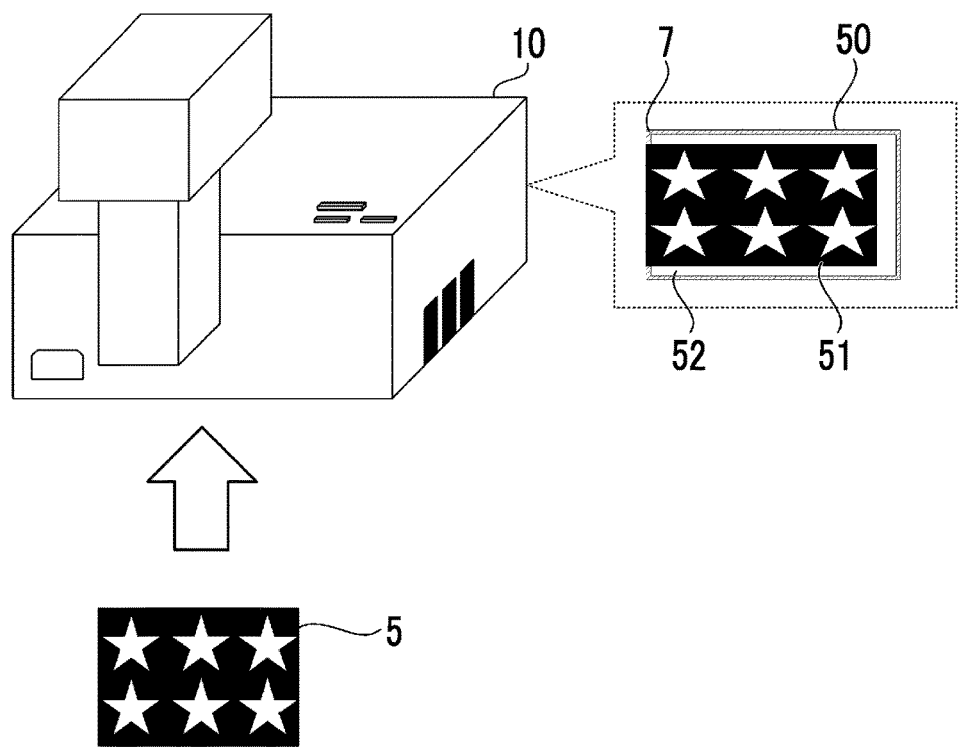

FIG. 7 is a diagram illustrating an example of the enlargement of the projection image 5*a*. For example, the control device 4 performs the control of projecting the support image 7 from the projection portion 1 as illustrated in FIG. 6 in an enlargement mode in which an instruction for the enlargement (geometric processing) of the projection image 5*a* can be received from the user by operating the key included in the operation reception portion 2. In a case where the instruction for the enlargement of the projection image 5*a* is received from the user, the control device 4 performs the enlargement (electronic enlargement) of the projection image 5*a* as illustrated in FIG. 7.

In the example illustrated in FIG. 7, the projection image 5*a* is enlarged in a left direction to near a left end of the displayable region 50. In the enlargement, projecting the support image 7 as illustrated in FIG. 6 enables the user to clearly recognize the left end of the displayable region 50 and easily perform an instruction operation for the enlargement. The enlargement of the projection image 5*a* is not limited to the enlargement in the left direction illustrated in FIG. 7 and can include various enlargement such as enlargement in a right direction, enlargement in an upward direction, enlargement in a downward direction, enlargement in an oblique direction, and enlargement while an aspect ratio is maintained.

Rotation of Projection Image 5*a*

Figure 8:
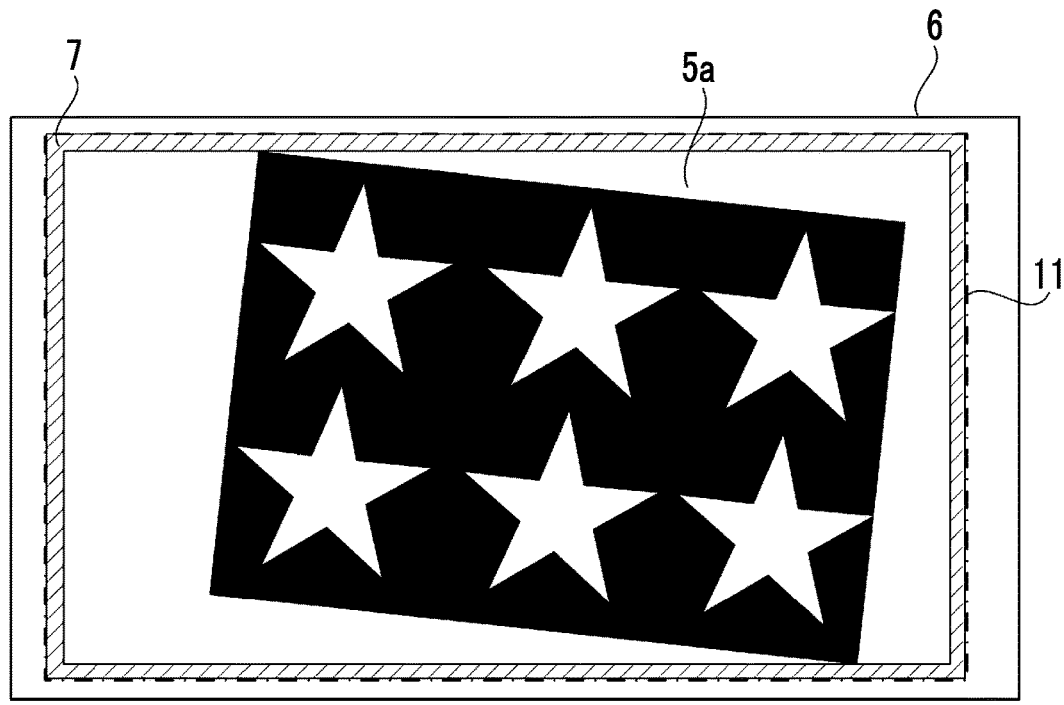
Figure 8:
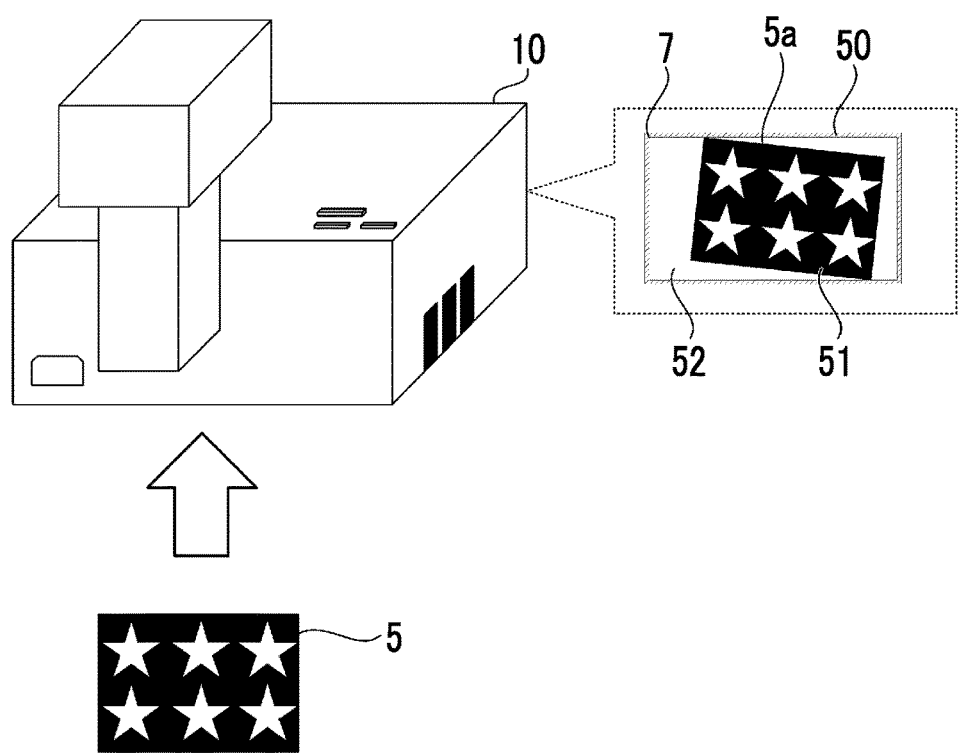

FIG. 8 is a diagram illustrating an example of the rotation of the projection image 5*a*. For example, the control device 4 performs the control of projecting the support image 7 from the projection portion 1 as illustrated in FIG. 6 in a rotation mode in which an instruction for the rotation (geometric processing) of the projection image 5*a* can be received from the user by operating the key included in the operation reception portion 2. In a case where the instruction for the rotation of the projection image 5*a* is received from the user, the control device 4 performs the rotation (electronic rotation) of the projection image 5*a* as illustrated in FIG. 8.

In the example illustrated in FIG. 8, the projection image 5*a* is rotated in a right rotation direction about a center of the projection image 5*a* as a rotation center until two corners of the projection image 5*a* reach near an upper end and a lower end of the displayable region 50. In the rotation, projecting the support image 7 as illustrated in FIG. 6 enables the user to clearly recognize the upper end and the lower end of the displayable region 50 and easily perform an instruction operation for the rotation. The rotation of the projection image 5*a* is not limited to the rotation illustrated in FIG. 8 and may be rotation in a left rotation direction or rotation about a point different from the center of the projection image 5*a* as the rotation center.

Modification of Projection Image 5*a*

Figure 9:
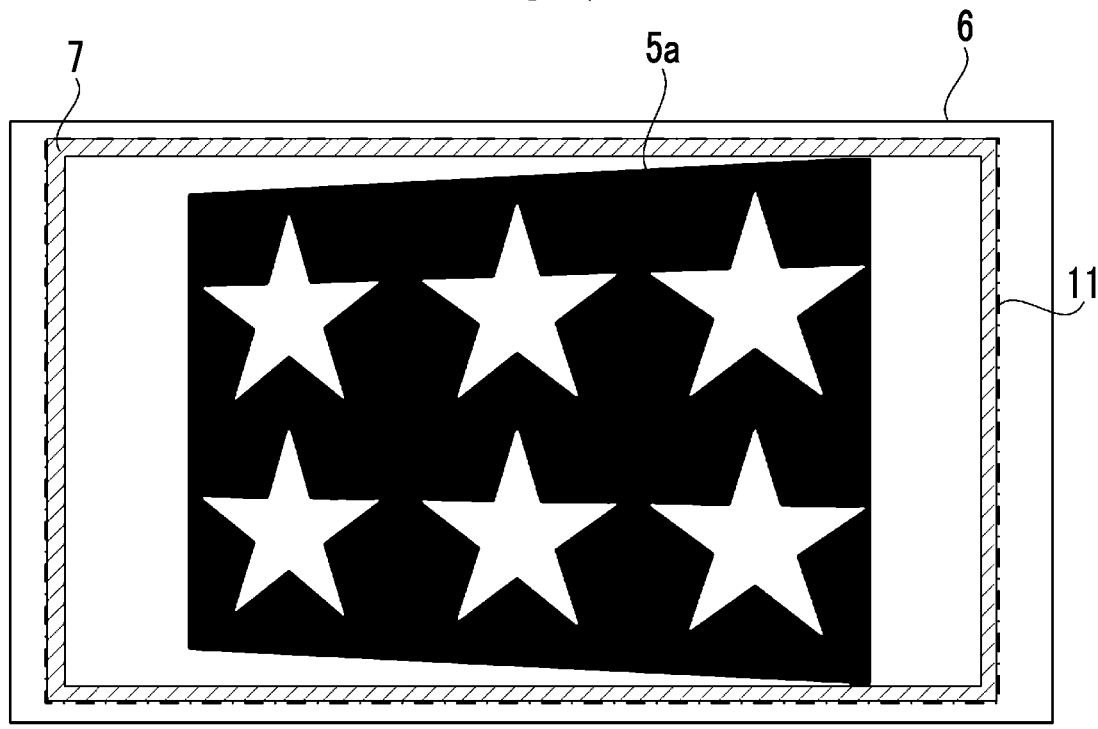
Figure 9:
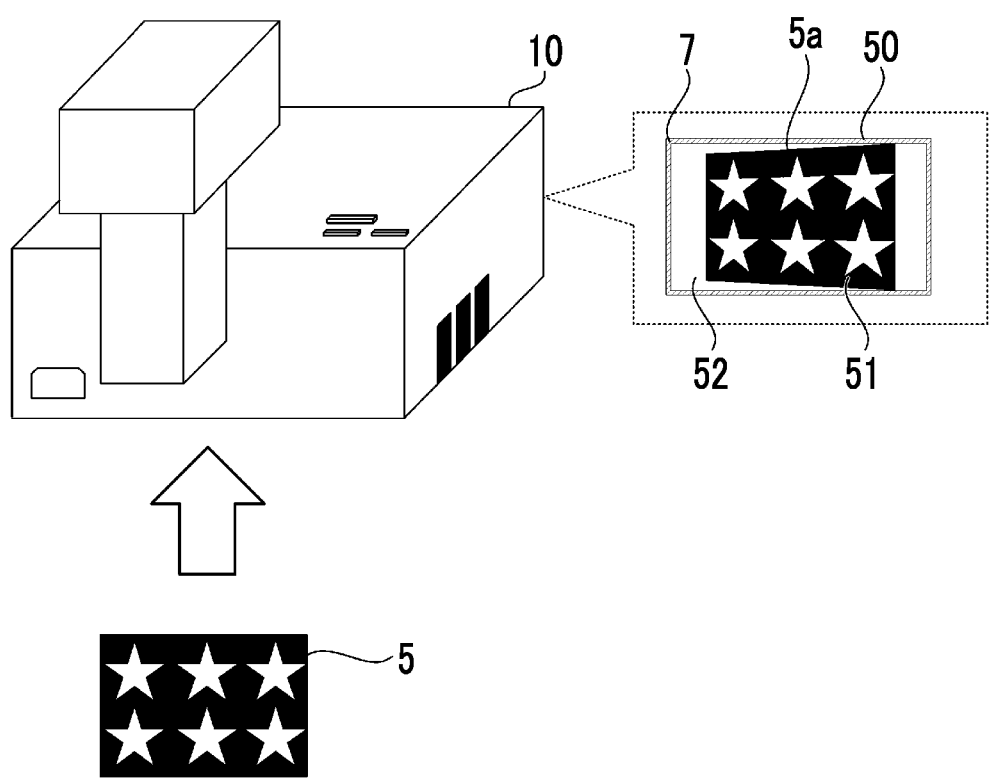

FIG. 9 is a diagram illustrating an example of the modification of the projection image 5*a*. For example, the control device 4 performs the control of projecting the support image 7 from the projection portion 1 as illustrated in FIG. 6 in a modification mode in which an instruction for the modification (geometric processing) of the projection image 5*a* can be received from the user by operating the key included in the operation reception portion 2. In a case where the instruction for the modification of the projection image 5*a* is received from the user, the control device 4 performs the modification (for example, the keystone correction) of the projection image 5*a* as illustrated in FIG. 9.

In the example illustrated in FIG. 9, the projection image 5*a* is modified until upper right and lower right corners of the projection image 5*a* reach near the upper end and the lower end of the displayable region 50, respectively. In the modification, projecting the support image 7 as illustrated in FIG. 6 enables the user to clearly recognize the upper end and the lower end of the displayable region 50 and easily perform an instruction operation for the modification. The modification of the projection image 5*a* is not limited to the modification illustrated in FIG. 9 and can include various modification.

Shifting of Projection Image 5*a*

Figure 10:
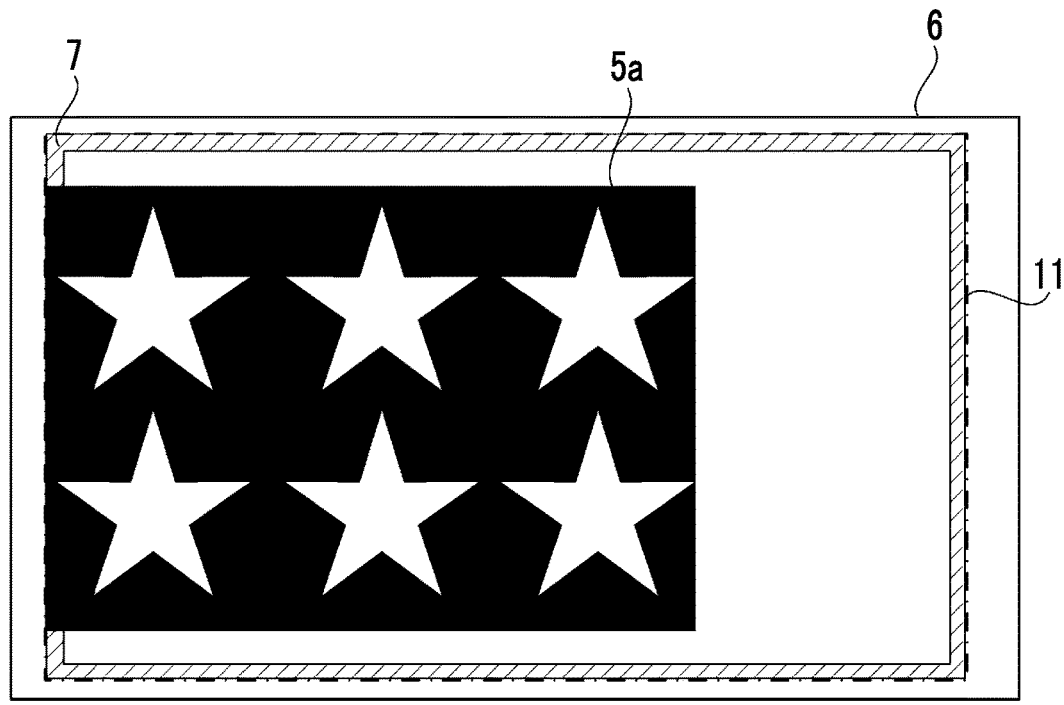
Figure 10:
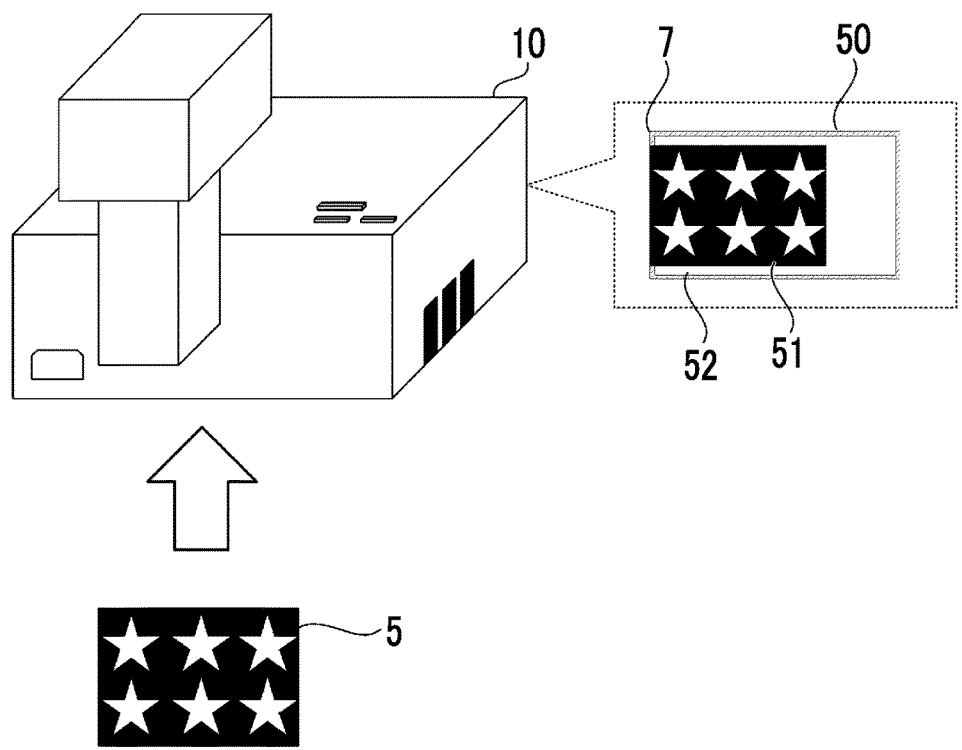

FIG. 10 is a diagram illustrating an example of the shifting of the projection image 5*a*. For example, the control device 4 performs the control of projecting the support image 7 from the projection portion 1 as illustrated in FIG. 6 in a shifting mode in which an instruction for the shifting (geometric processing) of the projection image 5*a* can be received from the user by operating the key included in the operation reception portion 2. In a case where the instruction for the shifting of the projection image 5*a* is received from the user, the control device 4 performs the shifting (electronic shifting) of the projection image 5*a* as illustrated in FIG. 10.

In the example illustrated in FIG. 10, the projection image 5*a* is shifted in the left direction to the left end of the displayable region 50. In the shifting, projecting the support image 7 as illustrated in FIG. 6 enables the user to clearly recognize the left end of the displayable region 50 and easily perform an instruction operation for the shifting. The shifting (movement) of the projection image 5*a* is not limited to the shifting in the left direction illustrated in FIG. 10 and can include various shifting such as shifting in the right direction, shifting in the upward direction, shifting in the downward direction, and oblique shifting.

As described, in a case of performing the geometric processing of the input image 5 in the non-display region 52 in a state where the projection image 5*a* based on the input image 5 is projected to the display region 51 of a part of the displayable region 50, the projection apparatus 10 projects the support image 7 showing the displayable region 50. Accordingly, in performing the instruction operation on the projection apparatus 10 for the geometric processing of the input image 5 using the non-display region 52, the user can clearly recognize the range within which the geometric processing of the input image 5 using the non-display region 52 can be performed. Thus, the instruction operation for the geometric processing such as the enlargement, the rotation, the modification, and the movement of the input image 5 can be easily performed.

In addition, setting the support image 7 as the image of the peripheral frame of the displayable region 50 enables the user to clearly recognize the range within which the geometric processing of the input image 5 using the non-display region 52 can be performed, while suppressing an influence on a look of the projection image 5a.

In addition, in a state where the instruction for the geometric processing of the projection image 5a cannot be received from the user via the operation reception portion 2, the control device 4 may perform a control of not projecting the support image 7 from the projection portion 1 as in FIG. 5. Accordingly, by not projecting the support image 7 in a state where the instruction for the geometric processing of the projection image 5a cannot be received from the user, the influence on the look of the projection image 5a can be suppressed.

Projection of Operation Image Performed by Projection Apparatus 10

Figure 11:
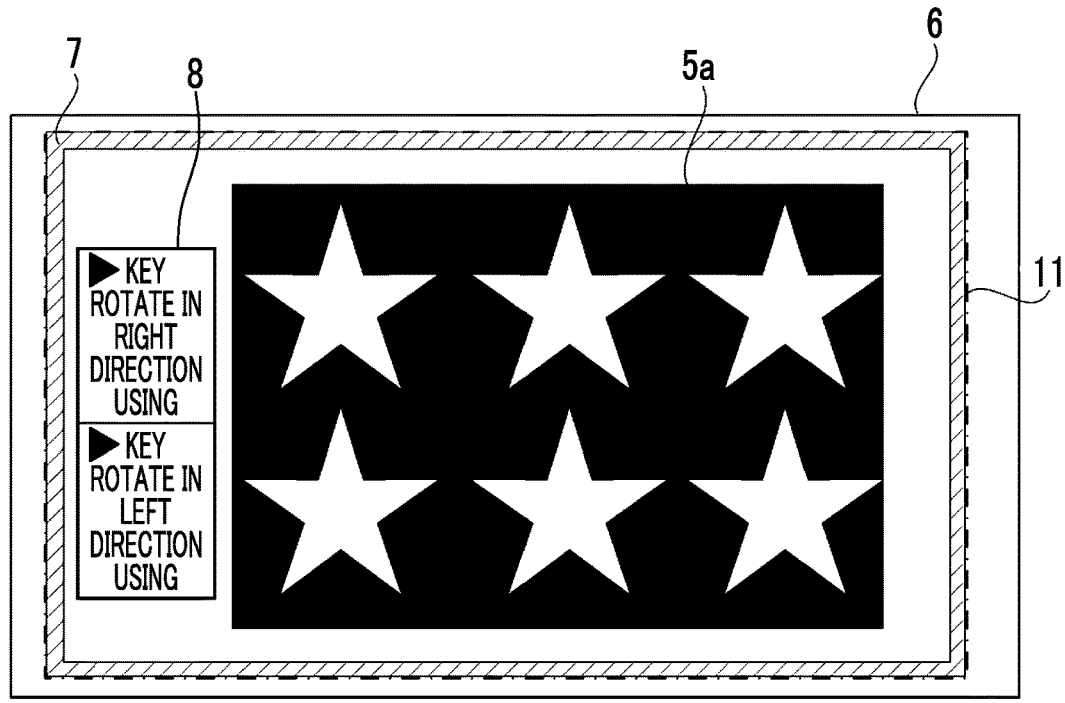
FIG. 11 is a diagram illustrating an example of projection of an operation image performed by the projection apparatus 10.
Figure 11:
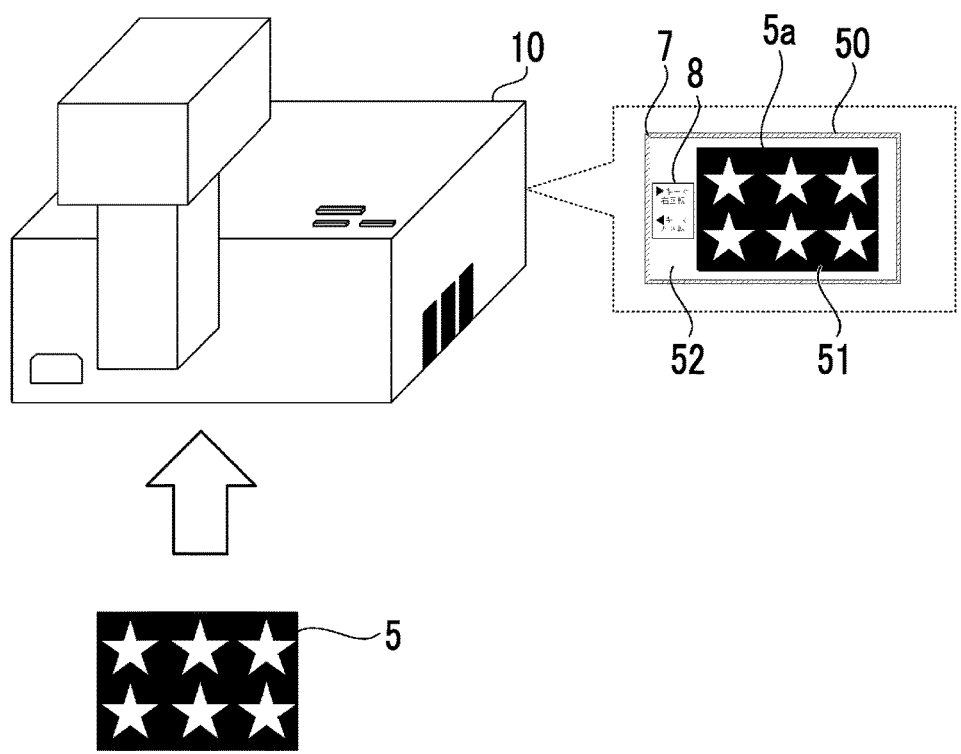

FIG. 11 is a diagram illustrating an example of projection of an operation image performed by the projection apparatus 10. In FIG. 11, an operation image 8 may be projected in an overlapping manner with the projection image 5a as an on-screen display (OSD) image.

The operation image 8 is an image for operating the projection apparatus 10. For example, the operation image 8 is an image showing a method of an operation of providing an instruction for the geometric processing such as the enlargement, the rotation, the modification, and the movement of the projection image 5a. In the example illustrated in FIG. 11, the operation image 8 guides the user to rotate the projection image 5a in the right direction using a right direction cursor key and rotate the projection image 5a in the left direction using a left direction cursor key. For example, in a case where the user performs an operation of pressing the right direction cursor key included in the operation reception portion 2, the control device 4 performs the geometric processing of rotating the projection image 5a in the right direction.

Alternatively, the operation image 8 may guide the user to perform an interactive operation that enables the projection image 5a to be operated by performing an operation of providing an instruction for the operation image 8 in the projection image. For example, in a case where the user performs an operation of providing an instruction for the right direction cursor key in the operation image 8 in the projection image, the control device 4 performs the geometric processing of rotating the projection image 5a in the right direction.

As a method of sensing the operation of providing the instruction for the operation image 8 in the projection image by the control device 4, for example, a method of providing the instruction by the user using an indicator including a sensor capable of detecting an instruction position in the projection image, and acquiring the instruction position from the indicator by the control device 4 can be used.

Alternatively, as a method of sensing the operation of providing the instruction for the operation image 8 in the projection image by the control device 4, a method of detecting the instruction provided by the user using image recognition based on a captured image obtained by imaging performed by an imaging apparatus that images the projection target object 6 may be used.

In addition, the control device 4 performs a control of projecting the operation image 8 to the non-display region 52 as illustrated in FIG. 11. Accordingly, it is possible to project the operation image 8 while suppressing a decrease in visibility of the projection image 5a. However, the present invention is not limited to such a configuration, and the control device 4 may project the operation image 8 to the display region 51.

Rotation of Operation Image 8 Accompanied by Rotation of Projection Image 5a

Figure 12:
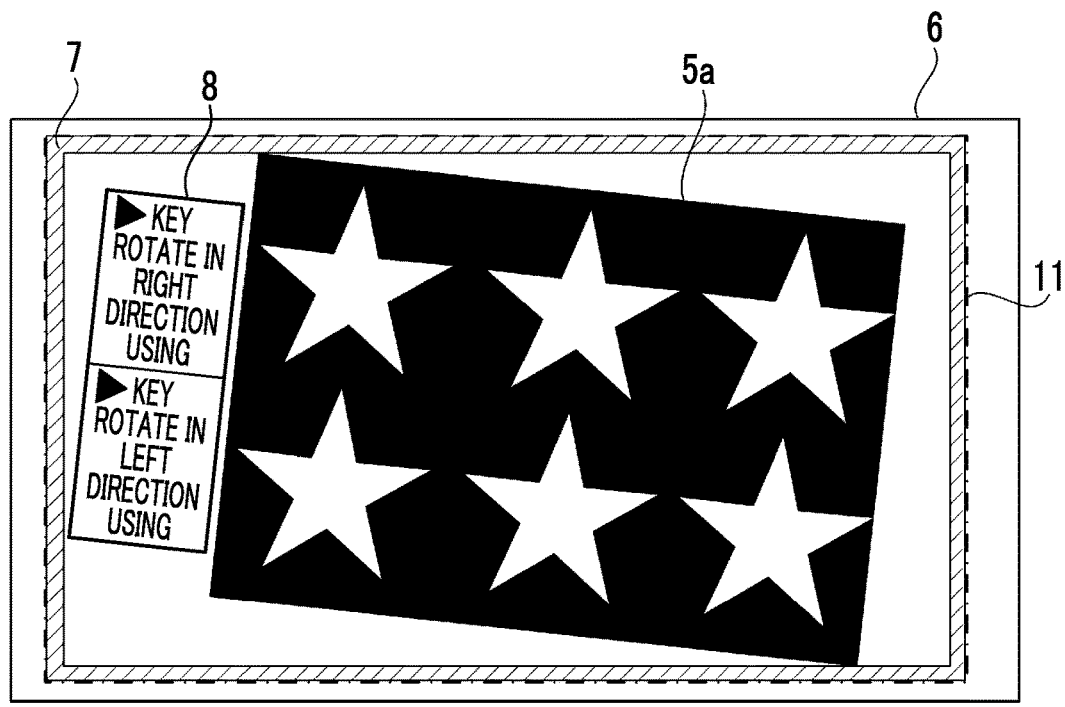
Figure 12:
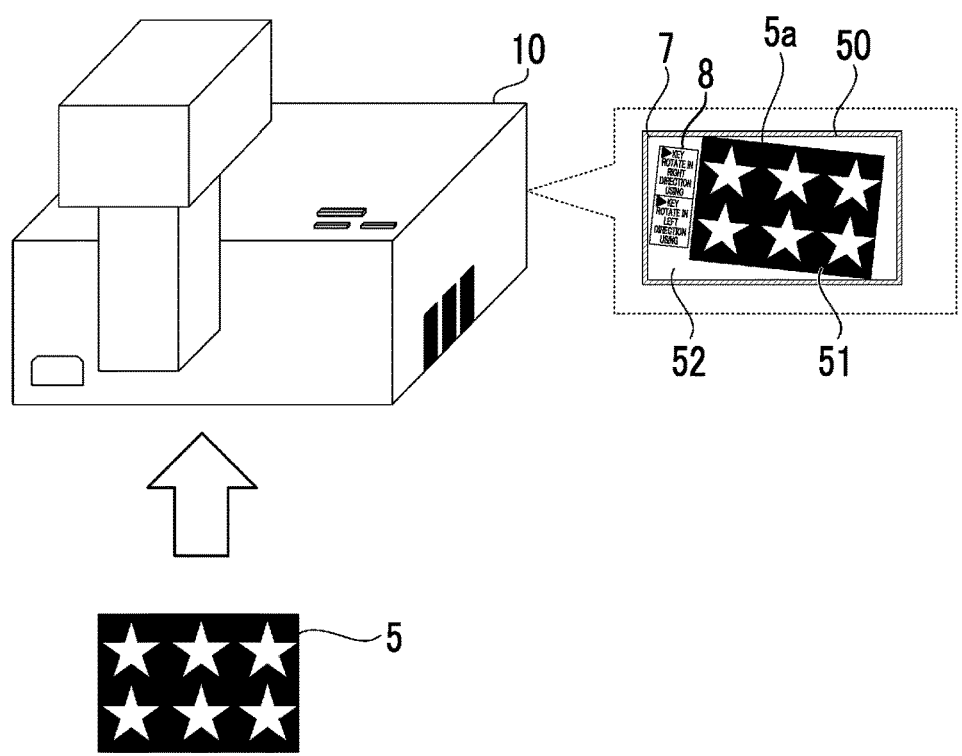

FIG. 12 is a diagram illustrating an example of rotation of the operation image 8 accompanied by the rotation of the projection image 5a. It is assumed that the user performs the instruction operation of rotating the projection image 5a in the right direction (for example, presses the right direction cursor key) in a state where the projection apparatus 10 is projecting the projection image 5a and the operation image 8 as illustrated in FIG. 11. In this case, the control device 4 performs rotation processing of rotating the projection image 5a in the right direction in accordance with the instruction operation from the user and also performs rotation processing having the same rotation direction and rotation amount as the rotation processing of the projection image 5a on the operation image 8.

Accordingly, for example, in a state where the projection apparatus 10 is inclined in the left direction, in a case where the user performs the instruction operation of rotating the projection image 5a in the right direction to make the projection image 5a projected to the projection target object 6 horizontal, it is possible to make the operation image 8 projected to the projection target object 6 also horizontal together with the projection image 5a. Thus, it is possible to improve visibility of the operation image 8 without separately performing the instruction operation for rotating the operation image 8 in the right direction.

Figure 13:
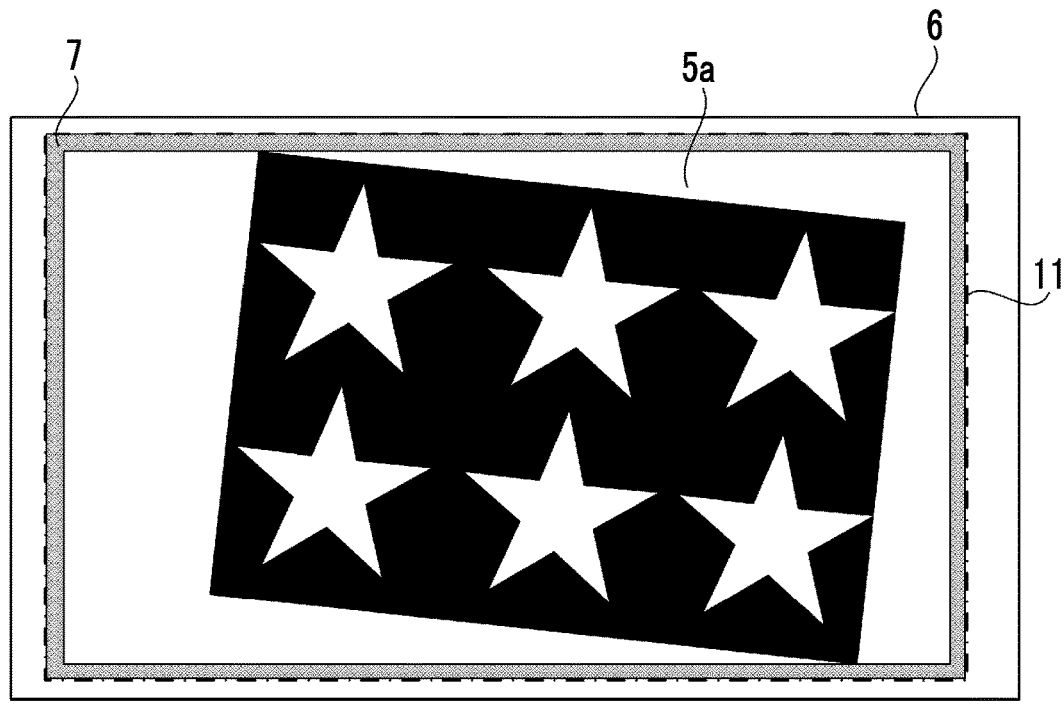
FIG. 13 is a diagram illustrating an example of output of warning information based on a modification amount of the projection image 5a by geometric processing.
Figure 13:
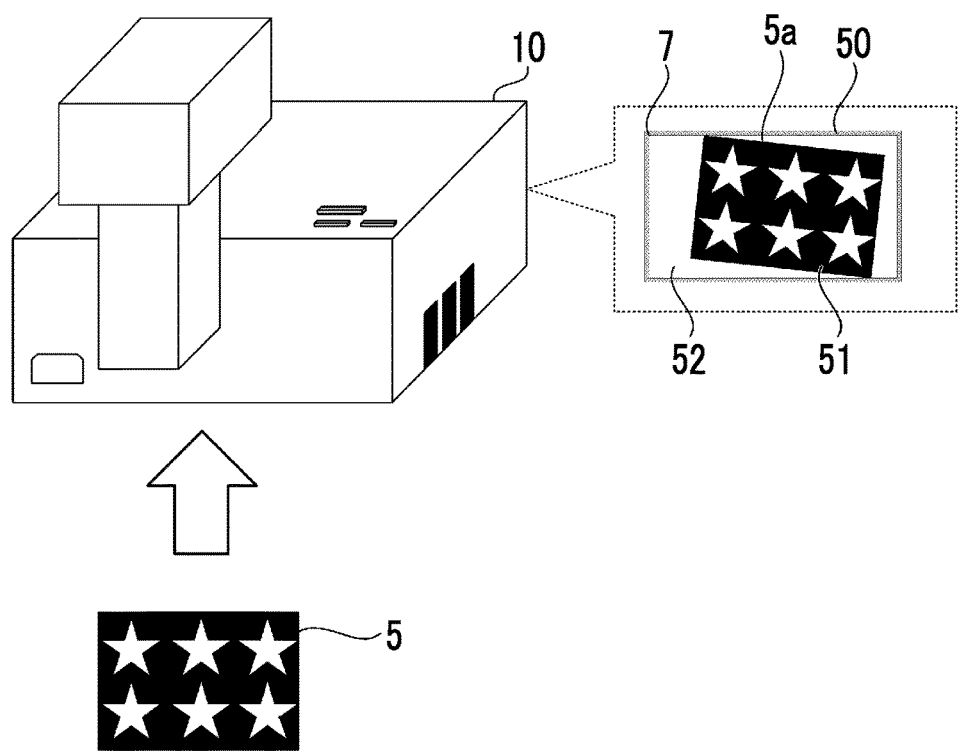

Output of Warning Information Based on Modification Amount of Projection Image 5a by Geometric Processing FIG. 13 is a diagram illustrating an example of output of warning information based on a modification amount of the projection image 5a by the geometric processing. In a case of performing processing accompanying the modification of the projection image 5a as the geometric processing, the control device 4 may output the warning information based on the modification amount of the projection image 5a. In the example in FIG. 13, the output of the warning information is changing of a color of the support image 7.

For example, in a case where the modification amount of the projection image 5a exceeds a predetermined value, the control device 4 changes the color of the support image 7 to a color different from the color of the support image 7 illustrated in FIG. 6. Accordingly, the user can recognize that the modification amount of the projection image 5a has exceeded the predetermined value. In addition, by outputting the warning information by changing the support image 7 showing the displayable region 50 that is a range within which the modification can be performed, the user can intuitively recognize that the modification amount of the projection image 5a has exceeded the predetermined value.

The predetermined value compared with the modification amount of the projection image 5a may be a preset fixed value or a value calculated based on a relationship between the current range of the projection image 5a and the displayable region 50.

Figure 14:
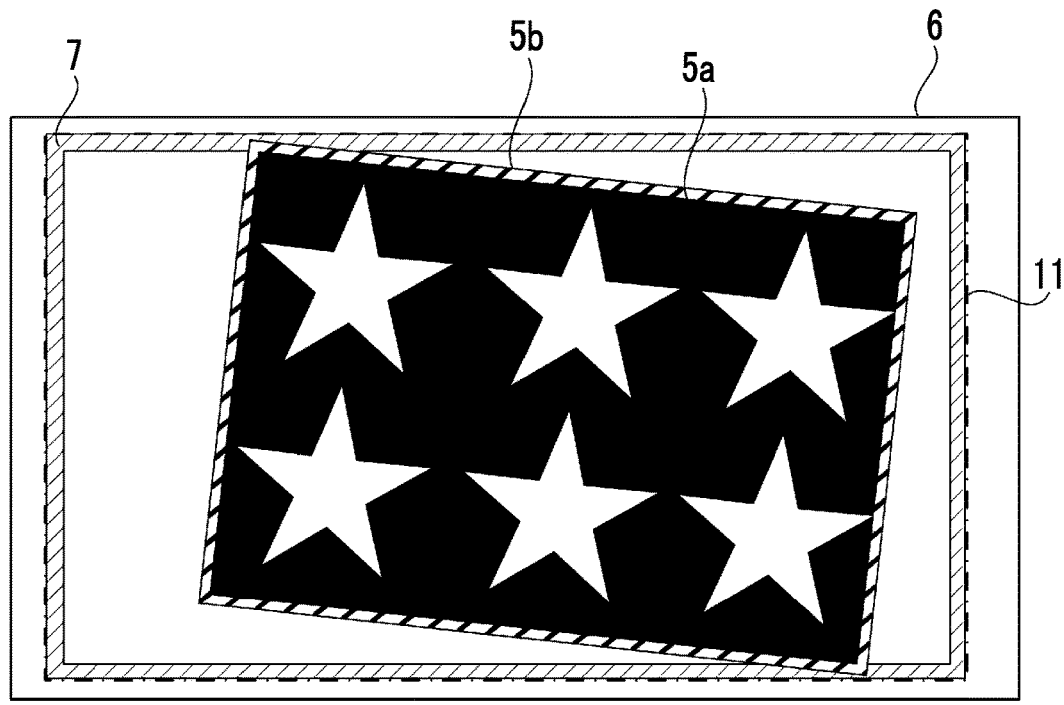
FIG. 14 is a diagram illustrating another example of the output of the warning information based on the modification amount of the projection image 5a by the geometric processing.
Figure 14:
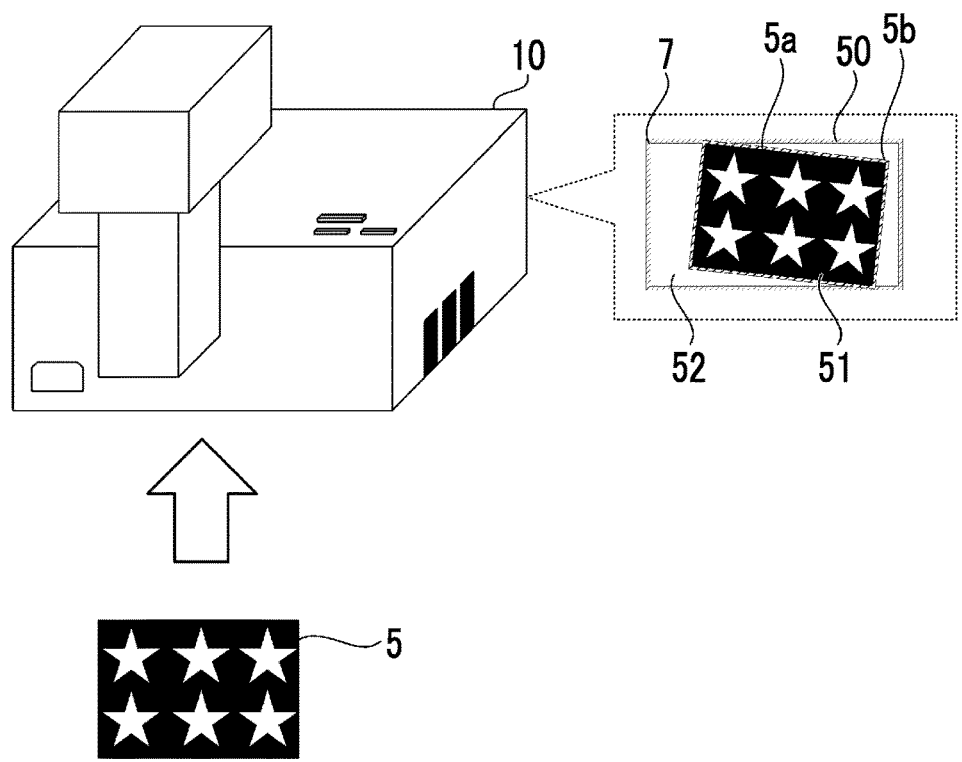

FIG. 14 is a diagram illustrating another example of the output of the warning information based on the modification amount of the projection image 5a by the geometric processing. As illustrated in FIG. 14, the output of the warning information based on the modification amount of the projection image 5a may be projection of a frame 5b in an overlapping manner with the projection image 5a. For example, in a case where the modification amount of the projection image 5a exceeds the predetermined value, the control device 4 performs a control of projecting the frame 5b surrounding the projection image 5a in an overlapping manner with the projection image 5a. Accordingly, the projection image 5a is highlighted by the frame 5b, and the user can recognize that the modification amount of the projection image 5a has exceeded the predetermined value. In addition, the control device 4 may perform both of the changing of the support image 7 illustrated in FIG. 13 and changing (highlighting) of the projection image 5a illustrated in FIG. 14 as the output of the warning information.

As described, the output of the warning information is not limited to the changing of the support image 7 and can include various processing that enable the user to recognize that the modification amount of the projection image 5a has exceeded the predetermined value. In addition, the output of the warning information may be display, audio output, or the like of a message such as "Modification amount of projection Image is excessively large".

Figure 15:
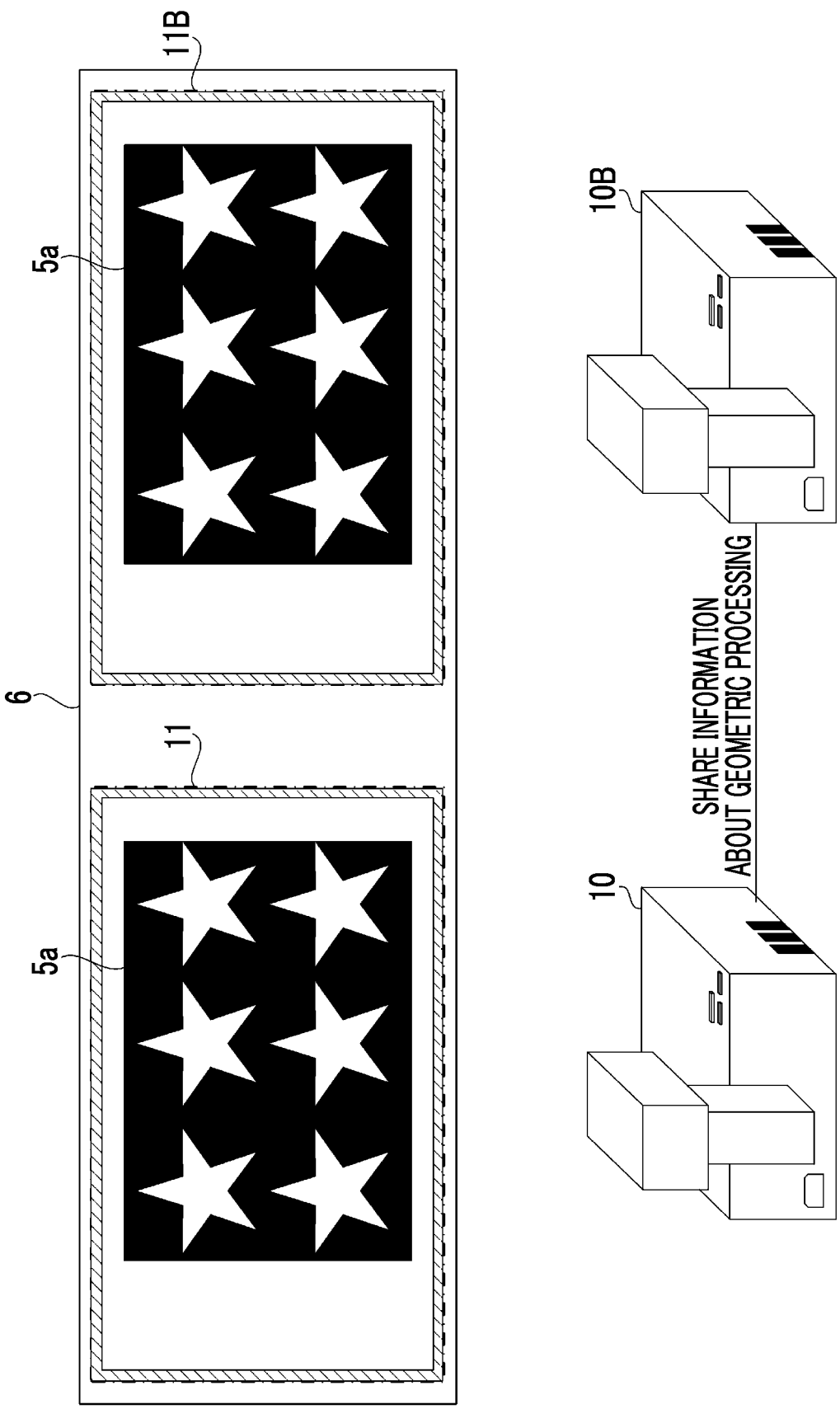
FIG. 15 is a diagram illustrating an example of sharing of information about the geometric processing between the projection apparatus 10 and another projection apparatus.

Sharing of Information About Geometric Processing Between Projection Apparatus 10 and Another Projection Apparatus FIG. 15 is a diagram illustrating an example of sharing of information about the geometric processing between the projection apparatus 10 and another projection apparatus. A projection apparatus 10B illustrated in FIG. 15 is a projection apparatus having the same configuration as the projection apparatus 10. A projectable range 11B is a projectable range of the projection apparatus 10B. In the example in FIG. 15, while the projectable ranges 11 and 11B are present in one projection target object 6, the projectable ranges 11 and 11B may be present in different projection target objects.

In addition, in the example in FIG. 15, while the same input image is input into the projection apparatuses 10 and 10B, and the same projection image 5a is projected to the projectable ranges 11 and 11B, different input images may be input into the projection apparatuses 10 and 10B, and different projection images may be projected to the projectable ranges 11 and 11B. The different input images input into the projection apparatuses 10 and 10B may be images obtained by dividing a horizontally long image into left and right parts.

In addition, in the example in FIG. 15, while the projectable ranges 11 and 11B are arranged at an interval, the projectable ranges 11 and 11B may be arranged adjacent to each other or may be arranged with an overlapping portion between each other.

The projection apparatuses 10 and 10B each comprise a communication portion and can communicate with each other. The communication between the projection apparatuses 10 and 10B may be wired communication or wireless communication. The projection apparatuses 10 and 10B share the information about the geometric processing with each other by communicating with each other.

For example, in a case where the enlargement (geometric processing) of the projection image 5a of the projection apparatus 10B is performed, the projection apparatus 10B transmits information indicating a direction and an amount of the enlargement to the projection apparatus 10. The projection apparatus 10 performs enlargement having the same amount and the same direction as the enlargement performed in the projection apparatus 10B on the projection image 5a of the projection apparatus 10 based on the information received from the projection apparatus 10B. Accordingly, by simply performing the instruction operation for the geometric processing of the projection image 5a of the projection apparatus 10B, the geometric processing can also be applied to the projection image 5a of the projection apparatus 10.

Projection of Support Image 7 Corresponding to Area of Non-Display Region 52

Figure 16:
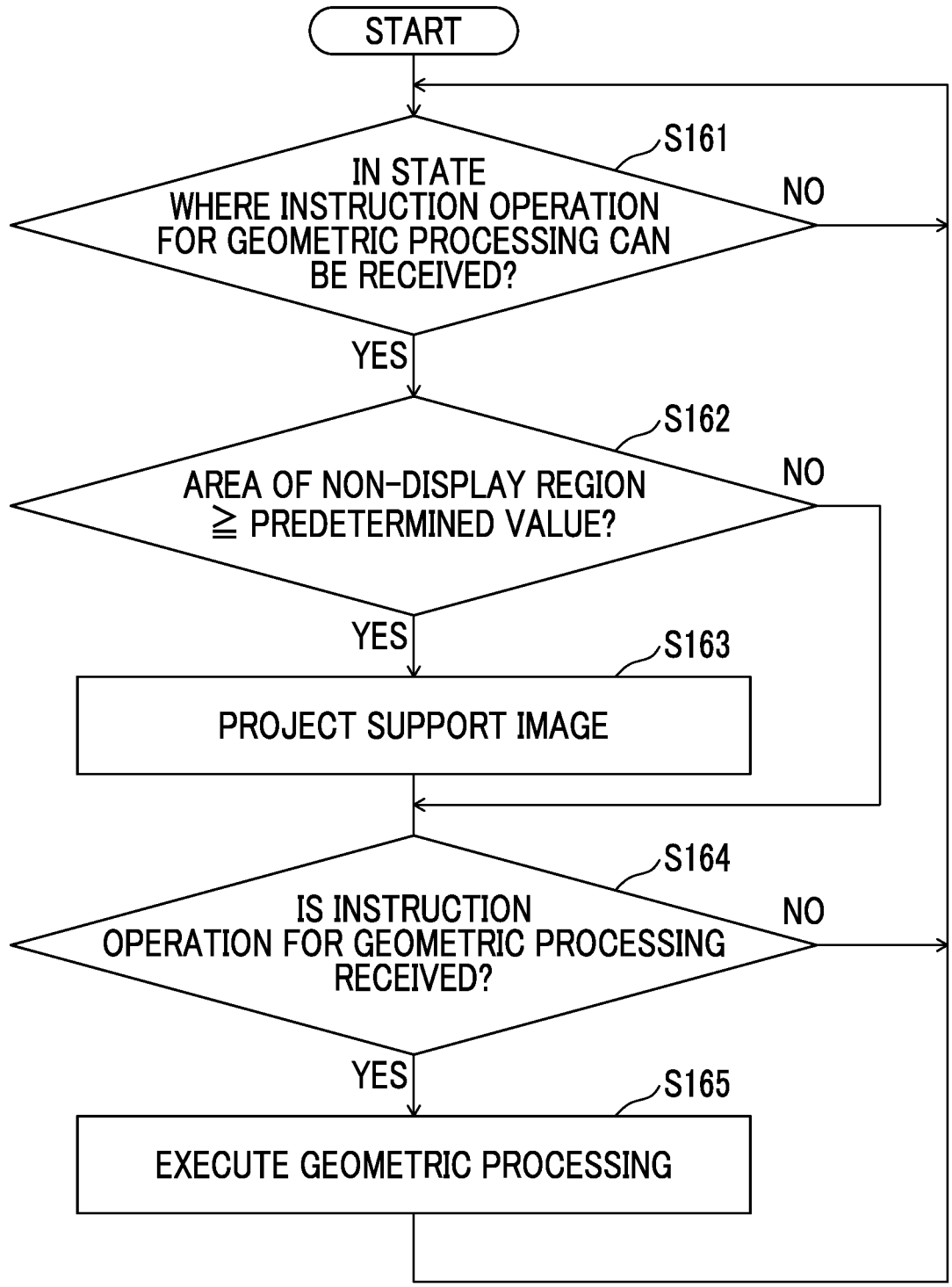
FIG. 16 is a flowchart illustrating an example of projection of a support image 7 corresponding to an area of a non-display region 52.

FIG. 16 is a flowchart illustrating an example of projection of the support image 7 corresponding to an area of the non-display region 52. For example, in a state where the projection image 5a is projected as illustrated in FIG. 5, the control device 4 executes processing illustrated in FIG. 16. First, the control device 4 determines whether or not the state where the instruction operation for the geometric processing can be received from the user is set (step S161), and waits until the state where the instruction operation for the geometric processing can be received from the user is set (loop of step S161: No).

In step S161, in a case where the state where the instruction operation for the geometric processing can be received from the user is set (step S161: Yes), the control device 4 determines whether or not the area of the non-display region 52 is greater than or equal to a predetermined value (step S162). As an example, the area of the non-display region 52 can be calculated by subtracting the number of pixels of the projection image 5a (display region 51) from the number of pixels of the displayable region 50.

In step S162, in a case where the area of the non-display region 52 is not greater than or equal to the predetermined value (step S162: No), the control device 4 transitions to step S164. At this point, in a case where the support image 7 is being projected, the control device 4 performs the control of not projecting the support image 7. In a case where the area of the non-display region 52 is greater than or equal to the predetermined value (step S162: Yes), the control device 4 projects the support image 7 as illustrated in FIG. 6 (step S163).

Next, the control device 4 determines whether or not the instruction operation for the geometric processing is received from the user (step S164). In a case where the instruction operation is not received (step S164: No), the control device 4 returns to step S161. In a case where the instruction operation is received (step S164: Yes), the control device 4 executes the geometric processing of the projection image 5a in accordance with the received instruction operation (step S165) and returns to step S161.

In the processing illustrated in FIG. 16, processing consisting of steps S162 and S163 and processing consisting of steps S164 and S165 may be executed in the opposite order or may be executed in parallel.

As described, the projection apparatus 10 may perform the control of projecting the support image 7 in accordance with the area of the non-display region 52. In the example in FIG. 16, it is possible to project the support image 7 in a case where the non-display region 52 is large, and not project the support image 7 in a case where the non-display region 52 is small. Accordingly, in a stage in which the non-display region 52 is large and an end part of the projection image 5a is separated from an end part of the displayable region 50, the support image 7 is projected, and the displayable region 50 in which the geometric processing of the projection image 5a can be performed can be recognized.

In addition, in a stage in which the non-display region 52 is decreased by performing the geometric processing to a certain extent, the support image 7 is not projected, and it is possible to prevent the support image 7 from impeding the instruction operation for the geometric processing or the visibility of the projection image 5a. In addition, in this stage, the range (display region 51) of the projection image 5a is close to the displayable region 50. Thus, the user can recognize the displayable region 50 in which the geometric processing of the projection image 5a can be performed, to a certain extent even in a case where the support image 7 is not projected.

Figure 17:
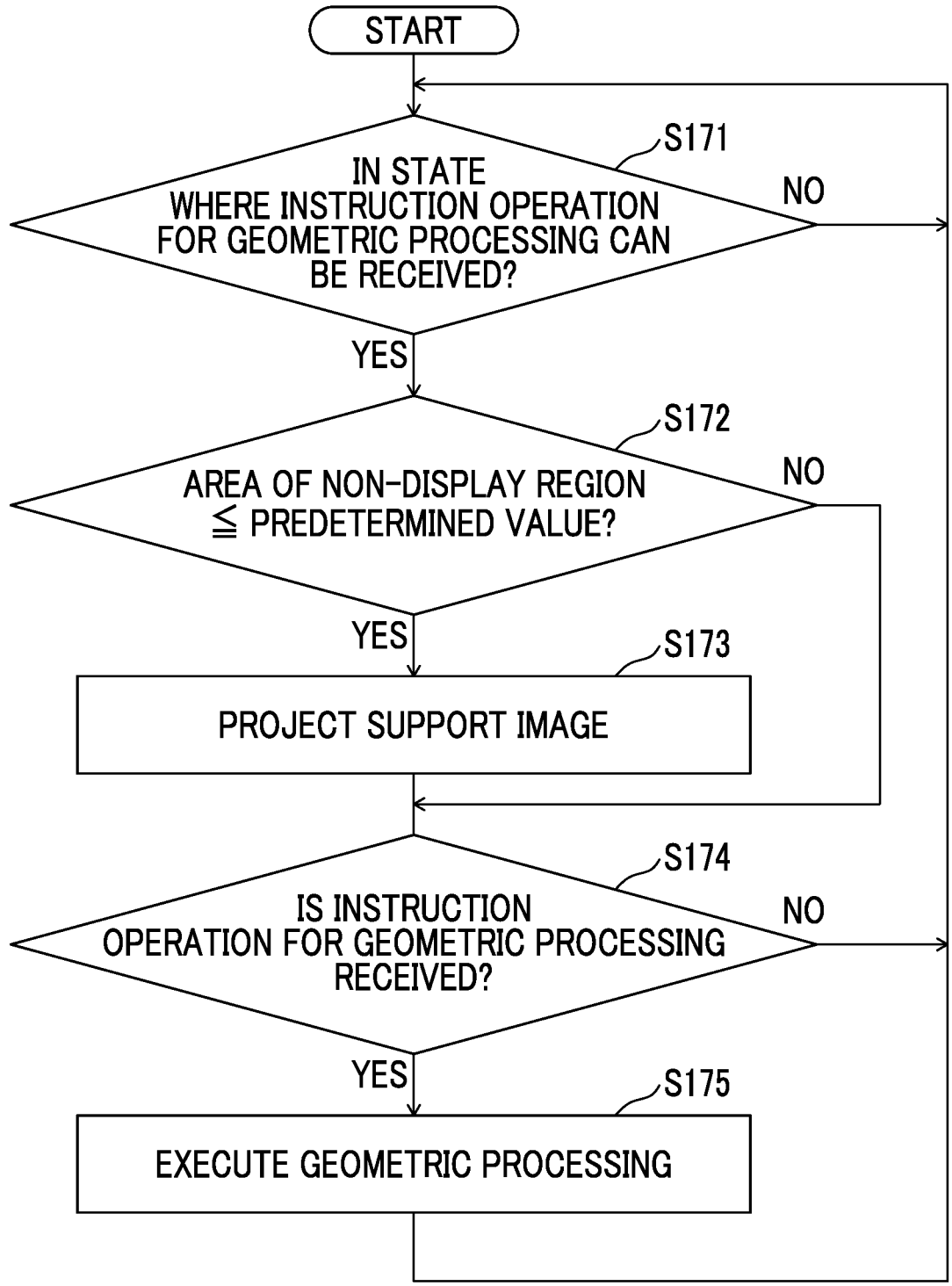
FIG. 17 is a flowchart illustrating another example of the projection of the support image 7 corresponding to the area of the non-display region 52.

FIG. 17 is a flowchart illustrating another example of the projection of the support image 7 corresponding to the area of the non-display region 52. For example, in a state where the projection image 5a is projected as illustrated in FIG. 5, the control device 4 may execute processing illustrated in FIG. 17. Steps S171 to S175 illustrated in FIG. 17 are the same as steps S161 to S165 illustrated in FIG. 16. However, in step S172, the control device 4 determines whether or not the area of the non-display region 52 is less than or equal to the predetermined value (step S172).

In step S172, in a case where the area of the non-display region 52 is not less than or equal to the predetermined value (step S172: No), the control device 4 transitions to step S174. In a case where the area of the non-display region 52 is less than or equal to the predetermined value (step S172: Yes), the control device 4 transitions to step S173.

In the processing illustrated in FIG. 17, processing consisting of steps S172 and S173 and processing consisting of steps S174 and S175 may be executed in the opposite order or may be executed in parallel.

As described, the projection apparatus 10 may project the support image 7 in a case where the non-display region 52 is small and there is small room for the geometric processing, and not project the support image 7 in a case where the non-display region 52 is large and there is large room for the geometric processing. Accordingly, by projecting the support image 7 in a stage in which there is small room for the geometric processing, the user can easily perform the geometric processing up to a full range of the displayable region 50. In addition, by not projecting the support image 7 in a stage in which there is large room for the geometric processing, the influence on the look of the projection image 5a can be suppressed. In addition, by projecting the support image 7 at a point in time when the non-display region 52 is decreased by performing the geometric processing in the non-display region 52 to a certain extent, the user can intuitively recognize that the support image 7 is an image showing a limit of the geometric processing.

In addition, the control device 4 may perform the control of projecting the support image in accordance with an attribute of the input image 5. For example, the attribute of the input image 5 is at least any of an aspect ratio, the number of pixels, or an image size (vertical×horizontal) of the input image 5. As an example, the control device 4 may perform the control of projecting the support image 7 in a case where the attribute (for example, the number of pixels) of the input image 5 falls outside a predetermined range, and not projecting the support image 7 in a case where the attribute of the input image 5 falls within the range.

As described, the control device 4 may perform the control of projecting the support image 7 in a case where the area of the non-display region 52 or the attribute of the input image falls outside the predetermined range, and not projecting the support image 7 in a case where the area of the non-display region 52 or the attribute of the input image falls within the predetermined range.

Modification Example of Support Image 7

Figure 18:
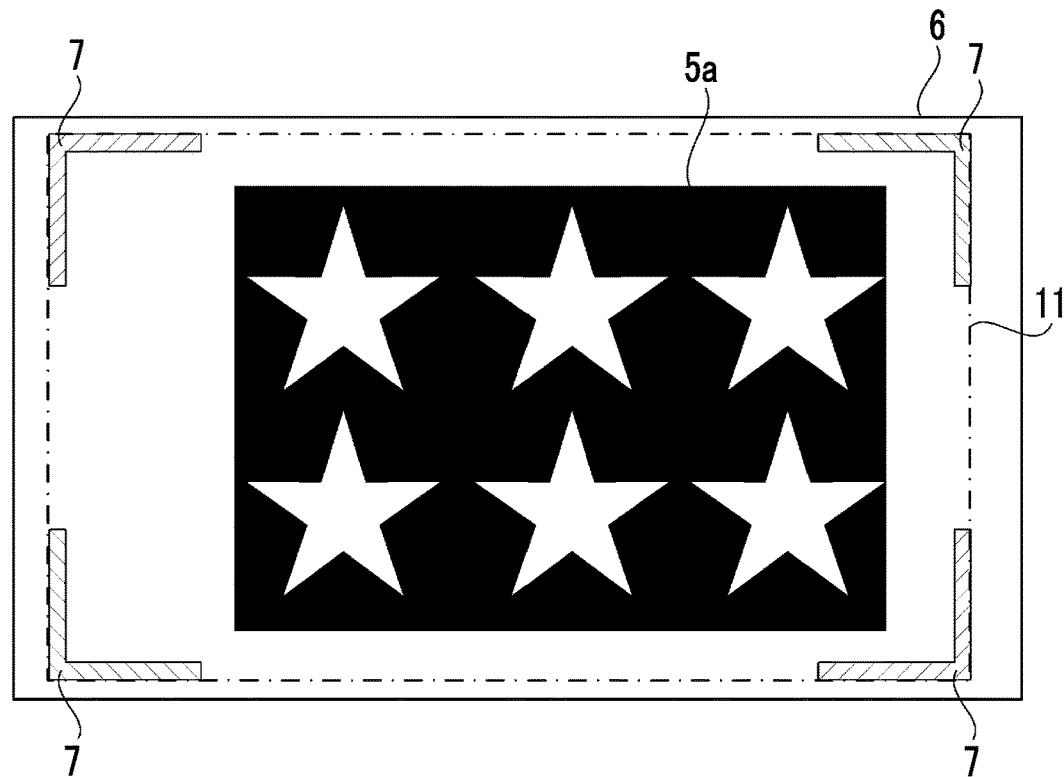
FIG. 18 is a diagram illustrating Modification Example 1 of the support image 7.
Figure 18:
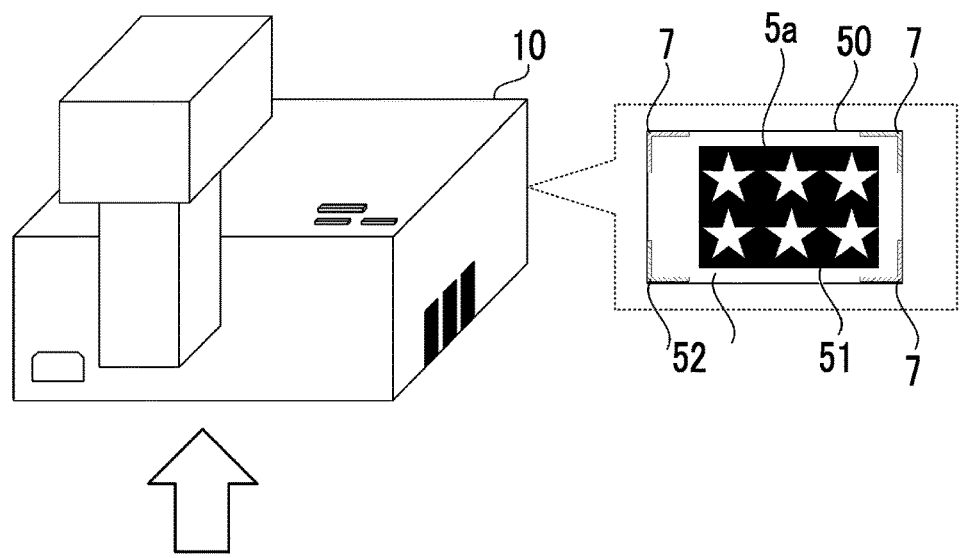
Figure 18:
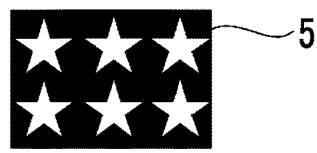
Figure 19:
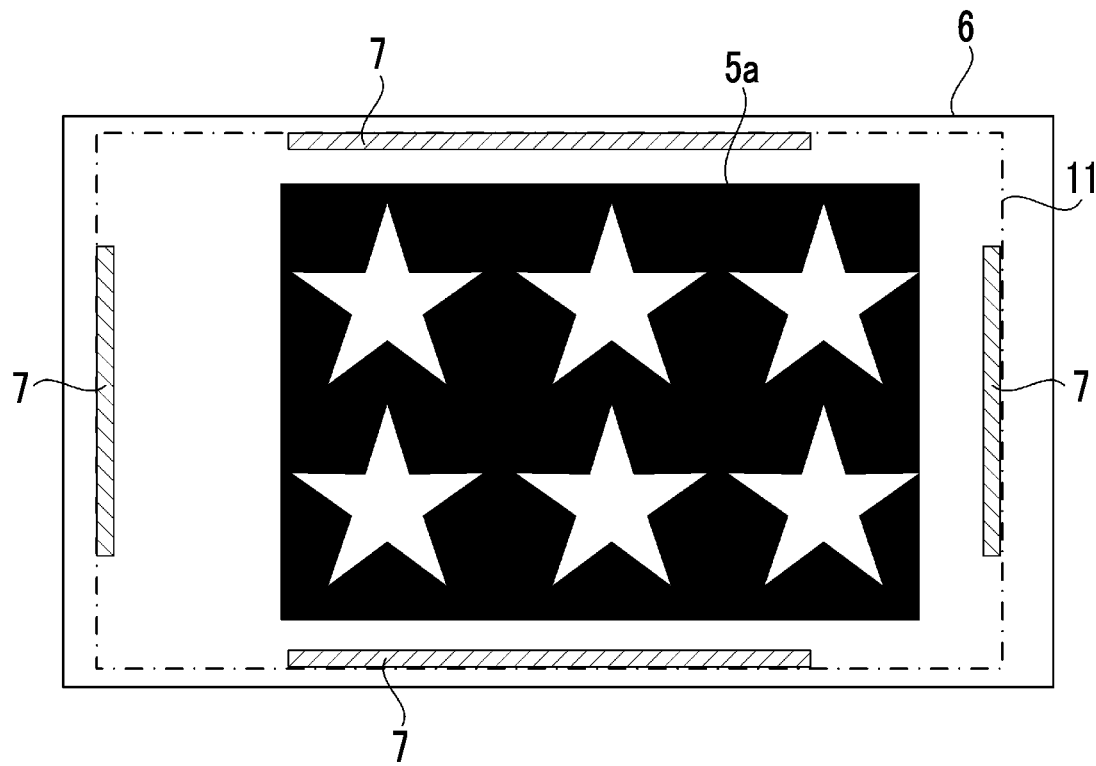
FIG. 19 is a diagram illustrating Modification Example 2 of the support image 7.
Figure 19:
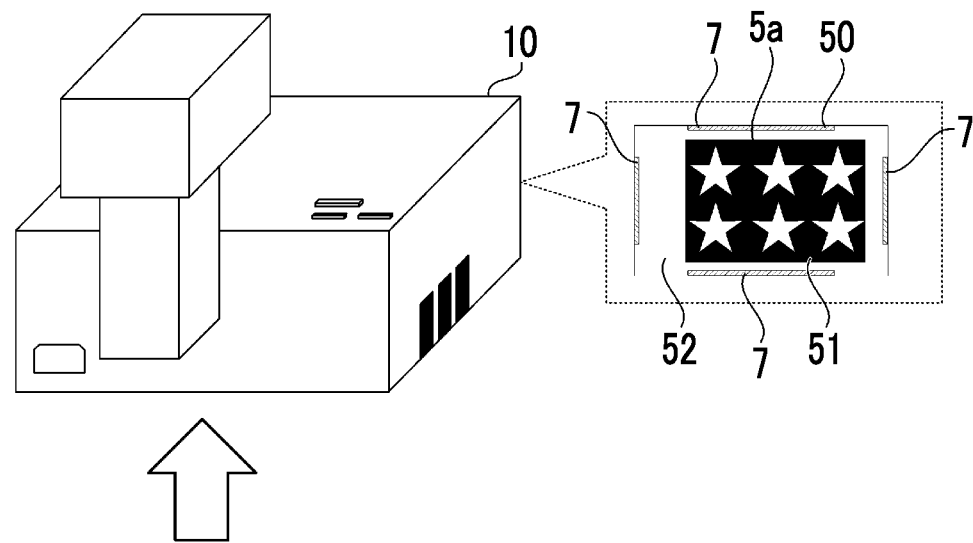
Figure 19:
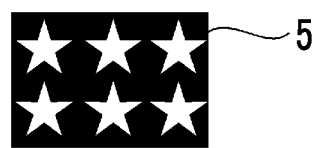

FIG. 18 is a diagram illustrating Modification Example 1 of the support image 7. FIG. 19 is a diagram illustrating Modification Example 2 of the support image 7. While the support image 7 showing the entire boundary (peripheral portion) of the displayable region 50 is described using FIG. 6 and the like, the support image 7 may be an image of a frame showing a part of the boundary of the displayable region 50 as illustrated in FIG. 18 and FIG. 19.

Figure 20:
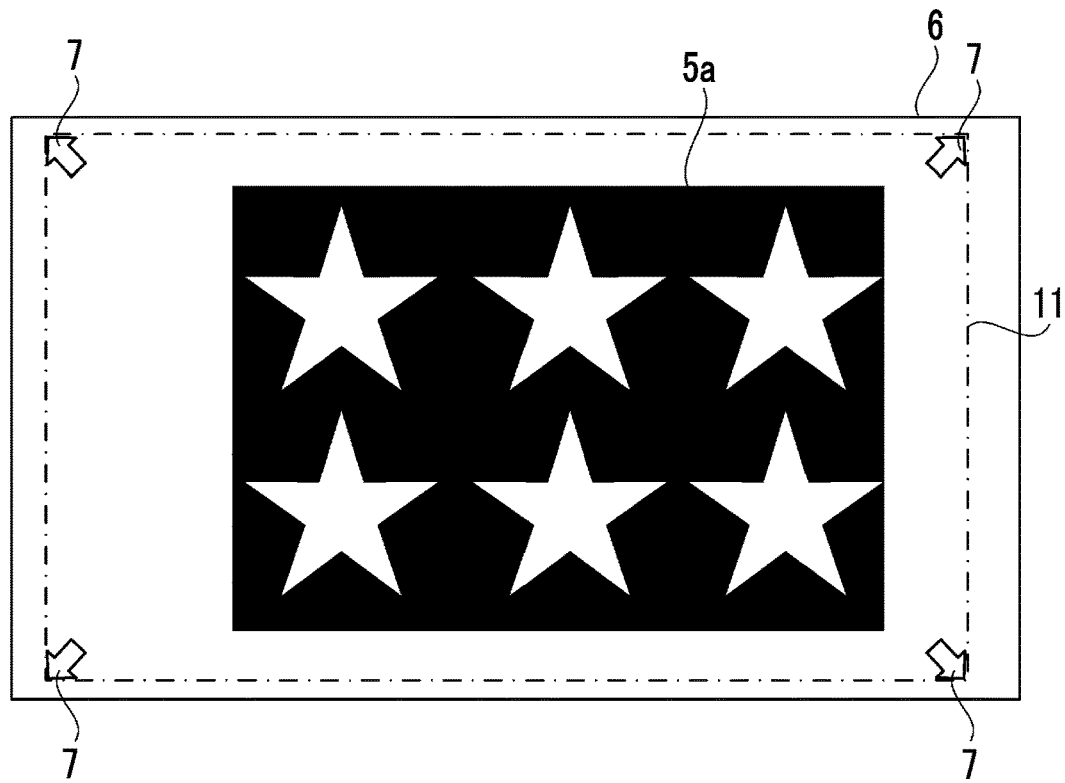
FIG. 20 is a diagram illustrating Modification Example 3 of the support image 7.
Figure 20:
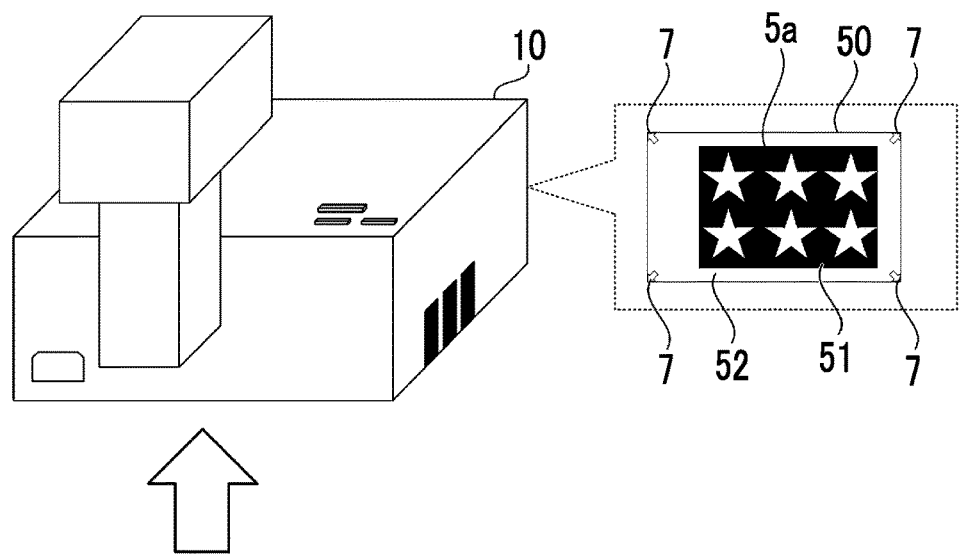
Figure 20:
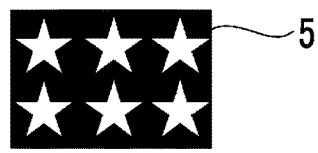

FIG. 20 is a diagram illustrating Modification Example 3 of the support image 7. The support image 7 is not limited to the image of the frame directly showing the part of the displayable region 50 and may be, for example, an image of a frame indirectly showing the part of the displayable region 50, such as images of four arrows pointing to four corners of the displayable region 50 as illustrated in FIG. 20. In addition, the support image 7 may be images of four arrows pointing to four sides of the displayable region 50. In addition, images of other marks such as a circle mark may be used instead of the images of the arrows.

Modification Example of Projection Apparatus 10

While a configuration of bending the optical axis K twice using the reflective member 122 and the reflective member 32 is described as the configuration of the projection apparatus 10 using FIG. 3 and FIG. 4, the optical axis K may be configured to be not bent by omitting the reflective member 122 and the reflective member 32. Alternatively, the optical axis K may be configured to be bent once by omitting any of the reflective member 122 and the reflective member 32.

Figure 21:
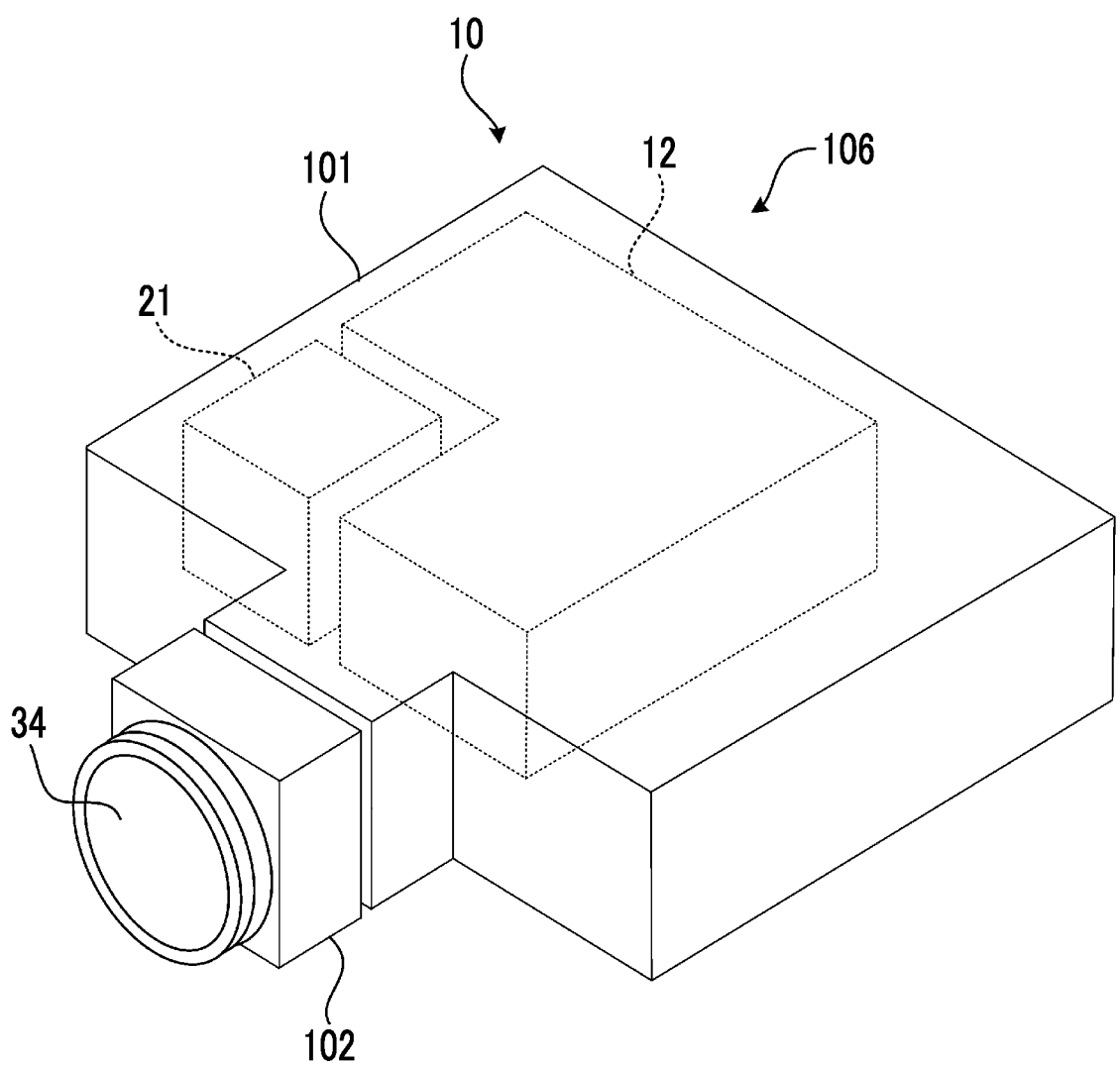
FIG. 21 is a schematic diagram illustrating another exterior configuration of the projection apparatus 10.
Figure 22:
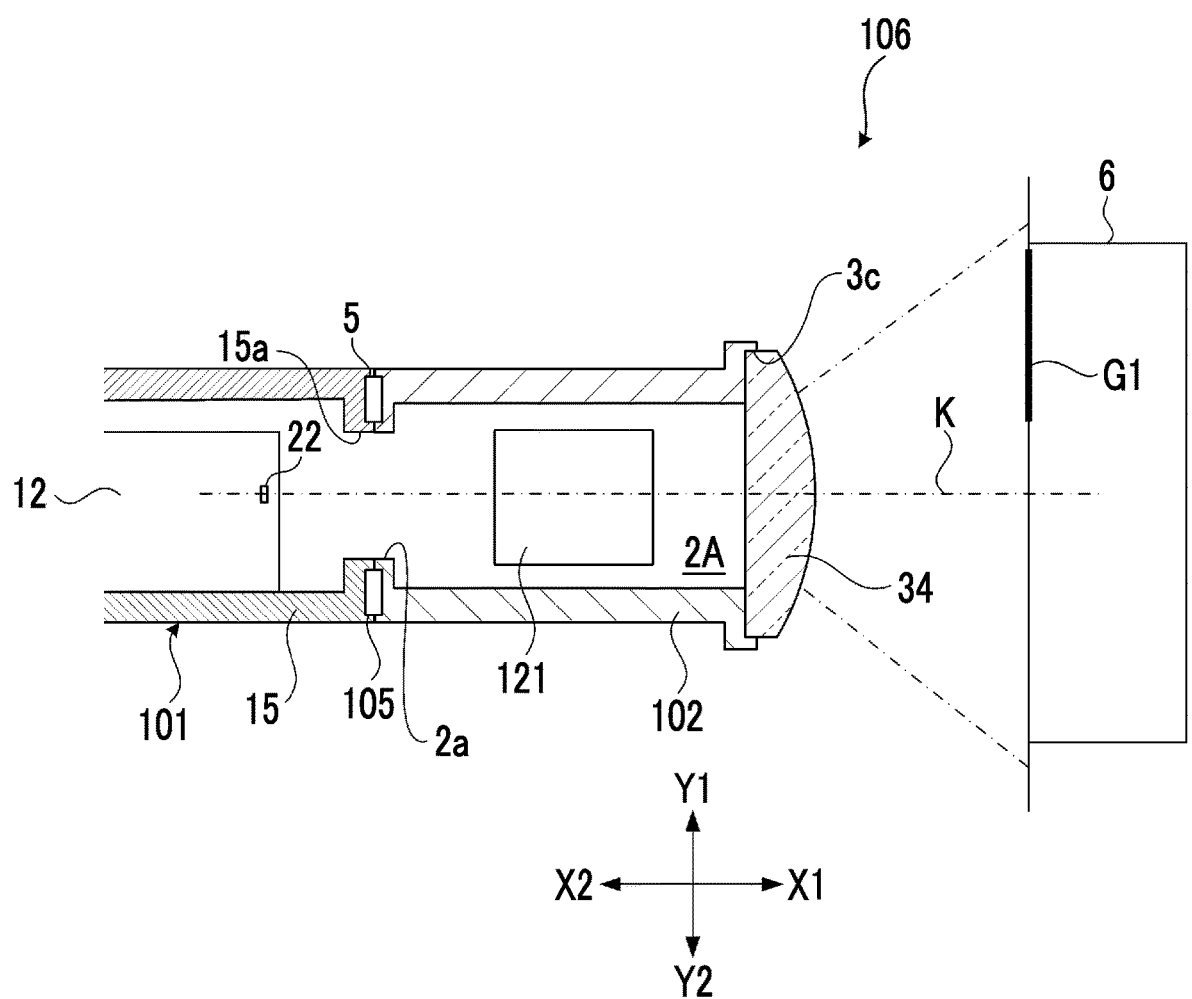
FIG. 22 is a schematic cross-sectional view of the optical unit 106 of the projection apparatus 10 illustrated in FIG. 21.

FIG. 21 is a schematic diagram illustrating another exterior configuration of the projection apparatus 10. FIG. 22 is a schematic cross-sectional view of the optical unit 106 of the projection apparatus 10 illustrated in FIG. 21. In FIG. 21 and FIG. 22, the same parts as the parts illustrated in FIG. 3 and FIG. 4 will be designated by the same reference numerals and will not be described.

The optical unit 106 illustrated in FIG. 21 comprises the first member 102 supported by the body part 101 and does not comprise the second member 103 illustrated in FIG. 3 and FIG. 4. In addition, the optical unit 106 illustrated in FIG. 21 does not comprise the reflective member 122, the second optical system 31, the reflective member 32, the third optical system 33, and the projection direction changing mechanism 104 illustrated in FIG. 3 and FIG. 4.

In the optical unit 106 illustrated in FIG. 21, the projection optical system 23 illustrated in FIG. 2 is composed of the first optical system 121 and the lens 34. The optical axis K of this projection optical system 23 is illustrated in FIG. 22. The first optical system 121 and the lens 34 are arranged in this order from the light modulation portion 22 side along the optical axis K.

The first optical system 121 guides the light that is incident on the first member 102 from the body part 101 and travels in the direction X1, to the lens 34. The lens 34 is arranged in an end part of the body part 101 on the direction X1 side in the form of closing the opening 3c formed in this end part. The lens 34 projects the light incident from the first optical system 121 to the projection target object 6.

Modification Example of Control Device

While a case of applying the control device of the embodiment to the control device 4 of the projection apparatus 10 is described, the present invention is not limited to such a configuration. For example, the control device of the embodiment may be another device that can directly or indirectly communicate with the projection apparatus 10. For example, the control device of the embodiment may be an information terminal such as a personal computer or a smartphone capable of communicating with the projection apparatus 10. In this case, the control device of the embodiment executes the above various controls by communicating with the projection apparatus 10.

OTHER MODIFICATION EXAMPLES

In addition, the control device 4 may perform a control of projecting a rod-like image that can be moved by a user operation and is used for providing an instruction for a position to which the geometric processing is performed, to the non-display region 52 in an overlapping manner with the projection image 5*a* or the support image 7. In addition, the control device 4 may perform a control of projecting an image for making the projectable range 11 overlap with another projectable range (for example, the projectable range 11B) to the non-display region 52 in an overlapping manner with the projection image 5*a* or the support image 7.

At least the following matters are disclosed in the present specification.

(1) A projection apparatus comprising a projection portion that projects a projection image generated by a display element based on an input image, and a processor, in which the processor is configured to, in a case of performing geometric processing of the projection image in a non-display region other than a display region of the projection image within a displayable region of the display element, perform a control of projecting a support image showing at least a part of the displayable region from the projection portion.

(2) The projection apparatus according to (1), in which the processor is configured to perform the geometric processing in response to receiving an instruction from a user.

(3) The projection apparatus according to (2), in which the processor is configured to, in a state where the instruction is to be received, perform the control of projecting the support image from the projection portion.

(4) The projection apparatus according to (2) or (3), in which the processor is configured to, in a state where the instruction is not to be received, perform a control of not projecting the support image from the projection portion.

(5) The projection apparatus according to any one of (1) to (4), in which the support image is an image of at least a part of a peripheral frame of the displayable region.

(6) The projection apparatus according to any one of (1) to (4), in which the geometric processing is processing of changing the projection image such that at least a part of the projection image is included in at least a part of the non-display region.

(7) The projection apparatus according to any one of (1) to (6), in which the geometric processing includes processing of at least any of enlargement, rotation, modification, or movement of the projection image.

(8) The projection apparatus according to any one of (1) to (7), in which the processor is configured to perform a control of projecting an operation image for operating the projection apparatus from the projection portion in an overlapping manner with the projection image and, in a case of performing rotation processing of the projection image as the geometric processing, perform rotation processing having the same rotation direction and rotation amount as the rotation processing on the operation image.

(9) The projection apparatus according to any one of (1) to (8), in which the processor is configured to perform a control of outputting warning information based on a modification amount of the projection image by the geometric processing.

(10) The projection apparatus according to any one of (1) to (9), further comprising a communication portion that communicates with another projection apparatus, in which the processor is configured to perform processing of sharing information about the geometric processing by communicating with the other projection apparatus via the communication portion.

(11) The projection apparatus according to any one of (1) to (10), in which the processor is configured to perform the control of projecting the support image in accordance with an area of the non-display region.

(12) The projection apparatus according to any one of (1) to (10), in which the processor is configured to perform the control of projecting the support image in accordance with an attribute of the input image.

(13) The projection apparatus according to (12), in which the attribute is at least any of an aspect ratio, the number of pixels, or an image size of the input image.

(14) The projection apparatus according to any one of (11) to (13), in which the processor is configured to perform the control of projecting the support image in a case where the area or an attribute falls outside a predetermined range.

(15) A projection method of a projection apparatus including a projection portion that projects a projection image generated by a display element based on an input image, the projection method comprising, by a processor configured to control the projection apparatus, performing, in a case of performing geometric processing of the projection image in a non-display region other than a display region of the projection image within a displayable region of the display element, a control of projecting a support image showing at least a part of the displayable region from the projection portion.

(16) The projection method according to (15), in which the processor is configured to perform the geometric processing in response to receiving an instruction from a user.

(17) The projection method according to (16), in which the processor is configured to, in a state where the instruction is to be received, perform the control of projecting the support image from the projection portion.

(18) The projection method according to (16) or (17), in which the processor is configured to, in a state where the instruction is not to be received, perform a control of not projecting the support image from the projection portion.

(19) The projection method according to any one of (15) to (18), in which the support image is an image of at least a part of a peripheral frame of the displayable region.

(20) The projection method according to any one of (15) to (18), in which the geometric processing is processing of changing the projection image such that at least a part of the projection image is included in at least a part of the non-display region.

(21) The projection method according to any one of (15) to (20), in which the geometric processing includes processing of at least any of enlargement, rotation, modification, or movement of the projection image.

(22) The projection method according to any one of (15) to (21), in which the processor is configured to perform a control of projecting an operation image for operating the projection apparatus from the projection portion in an overlapping manner with the projection image and, in a case of performing rotation processing of the projection image as the geometric processing, perform rotation processing having the same rotation direction and rotation amount as the rotation processing on the operation image.

(23) The projection method according to any one of (15) to (22), in which the processor is configured to perform a control of outputting warning information based on a modification amount of the projection image by the geometric processing.

(24) The projection method according to any one of (15) to (23), in which a communication portion that communicates with another projection apparatus is further provided, and the processor is configured to perform processing of sharing information about the geometric processing by communicating with the other projection apparatus via the communication portion.

(25) The projection method according to any one of (15) to (24), in which the processor is configured to perform the control of projecting the support image in accordance with an area of the non-display region.

(26) The projection method according to any one of (15) to (24), in which the processor is configured to perform the control of projecting the support image in accordance with an attribute of the input image.

(27) The projection method according to (26), in which the attribute is at least any of an aspect ratio, the number of pixels, or an image size of the input image.

(28) The projection method according to any one of (25) to (27), in which the processor is configured to perform the control of projecting the support image in a case where the area or an attribute falls outside a predetermined range.

(29) A control device of a projection apparatus including a projection portion that projects a projection image generated by a display element based on an input image, the control device comprising a processor, in which the processor is configured to, in a case of performing geometric processing of the projection image in a non-display region other than a display region of the projection image within a displayable region of the display element, perform a control of projecting a support image showing at least a part of the displayable region from the projection portion.

(30) A control program of a projection apparatus including a projection portion that projects a projection image generated by a display element based on an input image, the control program causing a processor configured to control the projection apparatus to execute a process comprising performing, in a case of performing geometric processing of the projection image in a non-display region other than a display region of the projection image within a displayable region of the display element, a control of projecting a support image showing at least a part of the displayable region from the projection portion.

Explanation of References

1: projection portion
2: operation reception portion
2A, 3A: hollow portion
2a, 2b, 3a, 3c, 15a: opening
4: control device
4a: storage medium
5: input image
5a: projection image
5b: frame
6: projection target object
7: support image
8: operation image
10, 10B: projection apparatus
11, 11B: projectable range
12: light modulation unit
15: housing
21: light source
22: light modulation portion
23: projection optical system
24: control circuit
31: second optical system
32, 122: reflective member
33: third optical system
34: lens
50: displayable region
51: display region
52: non-display region
101: body part
102: first member
103: second member
104: projection direction changing mechanism
105: shift mechanism
106: optical unit
121: first optical system
G1: image

What is claimed is:

1. A projection apparatus comprising:
a projection portion that projects a projection image generated by a display element based on an input image; and
a processor,
wherein the processor is configured to, in a case of performing geometric processing of the projection image in a non-display region other than a display region of the projection image within a displayable region of the display element, perform a control of projecting a support image showing at least a part of the displayable region from the projection portion,
wherein the support image is an image of at least a part of a peripheral frame of the displayable region, and
wherein the processor is configured to perform a control of projecting an operation image for operating the projection apparatus from the projection portion in an overlapping manner with the projection image and, in a case of performing rotation processing of the projection image as the geometric processing, perform rotation processing having the same rotation direction and rotation amount as the rotation processing on the operation image.

2. The projection apparatus according to claim 1, wherein the processor is configured to perform the geometric processing in response to receiving an instruction from a user.

3. The projection apparatus according to claim 2, wherein the processor is configured to, in a state where the instruction is to be received, perform the control of projecting the support image from the projection portion.

4. The projection apparatus according to claim 2, wherein the processor is configured to, in a state where the instruction is not to be received, perform a control of not projecting the support image from the projection portion.

5. The projection apparatus according to claim 1, wherein the geometric processing is processing of changing the projection image such that at least a part of the projection image is included in at least a part of the non-display region.

6. The projection apparatus according to claim 1,
wherein the geometric processing includes processing of at least any of enlargement, rotation, modification, or movement of the projection image.

7. The projection apparatus according to claim 1,
wherein the processor is configured to perform a control of outputting warning information based on a modification amount of the projection image by the geometric processing.

8. The projection apparatus according to claim 1, further comprising:
a communication portion that communicates with another projection apparatus,
wherein the processor is configured to perform processing of sharing information about the geometric processing by communicating with the other projection apparatus via the communication portion.

9. The projection apparatus according to claim 8,
wherein the processor is configured to perform the control of projecting the support image in accordance with an area of the non-display region.

10. The projection apparatus according to claim 1,
wherein the processor is configured to perform the control of projecting the support image in accordance with an attribute of the input image.

11. The projection apparatus according to claim 10,
wherein the attribute is at least any of an aspect ratio, the number of pixels, or an image size of the input image.

12. The projection apparatus according to claim 9,
wherein the processor is configured to perform the control of projecting the support image in a case where the area or an attribute falls outside a predetermined range.

13. A projection method of a projection apparatus including a projection portion that projects a projection image generated by a display element based on an input image, the projection method comprising:
by a processor configured to control the projection apparatus,
performing, in a case of performing geometric processing of the projection image in a non-display region other than a display region of the projection image within a displayable region of the display element, a control of projecting a support image showing at least a part of the displayable region from the projection portion,
wherein the support image is an image of at least a part of a peripheral frame of the displayable region, and
wherein the processor is configured to perform a control of projecting an operation image for operating the projection apparatus from the projection portion in an overlapping manner with the projection image and, in a case of performing rotation processing of the projection image as the geometric processing, perform rotation processing having the same rotation direction and rotation amount as the rotation processing on the operation image.

14. The projection method according to claim 13,
wherein the processor is configured to perform the geometric processing in response to receiving an instruction from a user.

15. The projection method according to claim 14,
wherein the processor is configured to, in a state where the instruction is to be received, perform the control of projecting the support image from the projection portion.

16. The projection method according to claim 14,
wherein the processor is configured to, in a state where the instruction is not to be received, perform a control of not projecting the support image from the projection portion.

17. The projection method according to claim 13,
wherein the geometric processing is processing of changing the projection image such that at least a part of the projection image is included in at least a part of the non-display region.

18. The projection method according to claim 13,
wherein the geometric processing includes processing of at least any of enlargement, rotation, modification, or movement of the projection image.

19. The projection method according to claim 13,
wherein the processor is configured to perform a control of outputting warning information based on a modification amount of the projection image by the geometric processing.

20. The projection method according to claim 13,
wherein a communication portion that communicates with another projection apparatus is further provided, and
the processor is configured to perform processing of sharing information about the geometric processing by communicating with the other projection apparatus via the communication portion.

21. The projection method according to claim 13,
wherein the processor is configured to perform the control of projecting the support image in accordance with an area of the non-display region.

22. The projection method according to claim 11,
wherein the processor is configured to perform the control of projecting the support image in accordance with an attribute of the input image.

23. The projection method according to claim 22,
wherein the attribute is at least any of an aspect ratio, the number of pixels, or an image size of the input image.

24. The projection method according to claim 21,
wherein the processor is configured to perform the control of projecting the support image in a case where the area or an attribute falls outside a predetermined range.

25. A control device of a projection apparatus including a projection portion that projects a projection image generated by a display element based on an input image, the control device comprising:
a processor,
wherein the processor is configured to, in a case of performing geometric processing of the projection image in a non-display region other than a display region of the projection image within a displayable region of the display element, perform a control of projecting a support image showing at least a part of the displayable region from the projection portion, and
wherein the support image is an image of at least a part of a peripheral frame of the displayable region, and
wherein the processor is configured to perform a control of projecting an operation image for operating the projection apparatus from the projection portion in an overlapping manner with the projection image and, in a case of performing rotation processing of the projection image as the geometric processing, perform rotation processing having the same rotation direction and rotation amount as the rotation processing on the operation image.

26. A non-transitory computer readable medium storing a control program of a projection apparatus including a projection portion that projects a projection image generated by a display element based on an input image, the control program causing a processor configured to control the projection apparatus to execute a process comprising:

performing, in a case of performing geometric processing of the projection image in a non-display region other than a display region of the projection image within a displayable region of the display element, a control of projecting a support image showing at least a part of the displayable region from the projection portion, wherein the support image is an image of at least a part of a peripheral frame of the displayable region, and wherein the processor is configured to perform a control of projecting an operation image for operating the projection apparatus from the projection portion in an overlapping manner with the projection image and, in a case of performing rotation processing of the projection image as the geometric processing, perform rotation processing having the same rotation direction and rotation amount as the rotation processing on the operation image.

* * * * *